(12) United States Patent
Long et al.

(10) Patent No.: US 6,435,600 B1
(45) Date of Patent: Aug. 20, 2002

(54) METHOD FOR OPERATING A VEHICLE POWER SLIDING DOOR

(75) Inventors: Richard L. Long, Clarkston; Robert M. Williams, Jr., Grand Blanc; Robert J. Faubert, Rochester Hills; Richard C. Kapes, Shelby Township; Thomas L. McGettrick, Linden; Jason Abraham, Canton, all of MI (US)

(73) Assignees: DaimlerChrysler Corporation, Auburn Hills, MI (US); Atoma International Corp., Newmarket (CA)

( * ) Notice: Subject to any disclaimer, the term of this patent is extended or adjusted under 35 U.S.C. 154(b) by 0 days.

(21) Appl. No.: 09/469,039

(22) Filed: Dec. 21, 1999

(51) Int. Cl.$^7$ .................................................. B60J 5/06
(52) U.S. Cl. .......................... 296/155; 49/280; 49/360
(58) Field of Search ............................ 296/146.4, 155; 49/139, 140, 360, 280

(56) References Cited

U.S. PATENT DOCUMENTS

| | | | | |
|---|---|---|---|---|
| 4,098,023 A | * | 7/1978 | Slopa | 49/139 |
| 4,612,729 A | | 9/1986 | Sato | 49/362 |
| 4,640,050 A | | 2/1987 | Yamagishi et al. | 49/280 |
| 4,855,653 A | | 8/1989 | Lemirande | 318/282 |
| 4,887,390 A | | 12/1989 | Boyko et al. | 49/214 |
| 4,945,677 A | * | 8/1990 | Kramer | 49/139 X |
| 5,039,925 A | * | 8/1991 | Schap | 49/139 X |
| 5,063,710 A | * | 11/1991 | Schap | 49/139 X |
| 5,076,016 A | | 12/1991 | Adams et al. | 49/360 |
| 5,105,131 A | * | 4/1992 | Schap | 49/139 X |
| 5,140,316 A | | 8/1992 | DeLand et al. | 340/825.69 |
| 5,155,937 A | | 10/1992 | Yamagishi et al. | 49/280 |
| 5,189,839 A | | 3/1993 | DeLand et al. | 49/360 |
| 5,203,112 A | | 4/1993 | Yamagishi et al. | 49/280 |
| 5,239,779 A | | 8/1993 | Deland et al. | 49/360 |
| 5,351,441 A | | 10/1994 | Hormann | 49/362 |
| 5,483,769 A | | 1/1996 | Zweili | 49/118 |
| 5,536,061 A | | 7/1996 | Moore et al. | 296/155 |
| 5,618,068 A | | 4/1997 | Mitsui et al. | 292/201 |
| 5,618,080 A | | 4/1997 | Sullivan et al. | 296/155 |
| 5,758,453 A | | 6/1998 | Inage | 49/118 |
| 5,833,301 A | | 11/1998 | Watanabe et al. | 296/155 |
| 5,836,639 A | | 11/1998 | Kleefeldt et al. | 296/155 |
| 5,867,940 A | | 2/1999 | Watanabe et al. | 49/360 |
| 6,079,767 A | * | 6/2000 | Faubert et al. | 296/155 |
| 6,089,649 A | * | 7/2000 | Hamada et al. | 296/155 |
| 6,091,162 A | * | 7/2000 | Williams, Jr. et al. | 49/280 X |
| 6,174,020 B1 | * | 1/2001 | Knettle et al. | 296/155 |
| 6,189,406 B1 | | 2/2001 | Kapes | |
| 6,256,930 B1 | | 7/2001 | Faubert | |
| 6,276,743 B1 | | 8/2001 | Jyawook | |

FOREIGN PATENT DOCUMENTS

JP      60-199722      10/1985

* cited by examiner

Primary Examiner—Stephen T. Gordon
Assistant Examiner—Patricia Engle
(74) Attorney, Agent, or Firm—Ralph E. Smith

(57) ABSTRACT

A method is provided for controlling a power sliding door system having a power drive mechanism for propelling the sliding door and a power latching mechanism for latching the sliding door in a latched condition. The methodology provides enhanced monitoring and control of the power sliding door system to improve the operation of the sliding door in both the power-assisted and manual modes. The control methodology inhibits the operation of the power sliding door system in response to the actuation of any of the sliding door handles or if a fuel door is in the path of the sliding door. The control methodology also inhibits the operation of the sliding door system if a child guard mechanism is enabled. The control methodology includes an obstacle detection routine which detects obstacles in two directions of travel. The control methodology does not require the power drive mechanism or inertia to cause the latch mechanism to latch the sliding door in the latched condition.

15 Claims, 24 Drawing Sheets

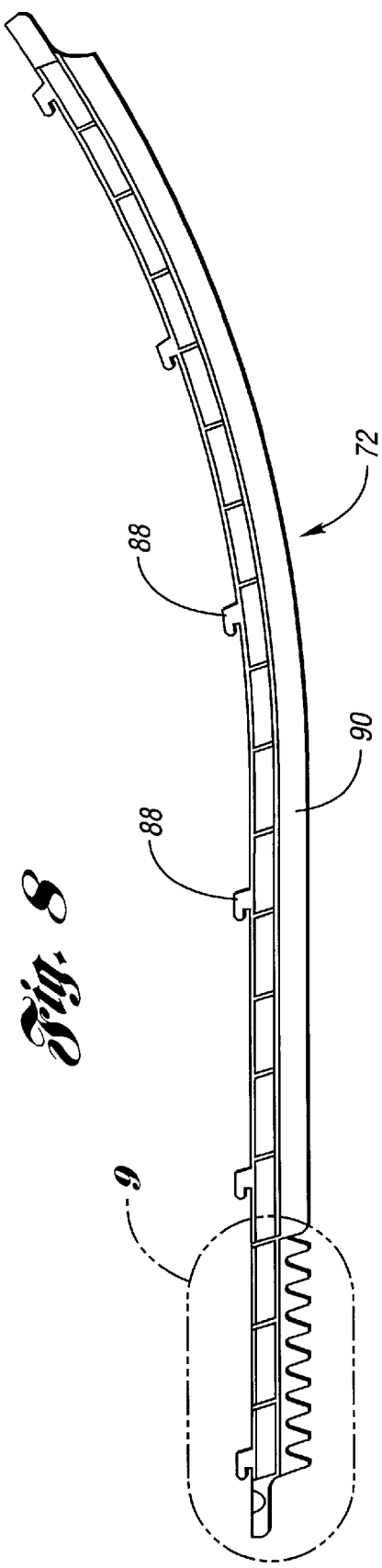
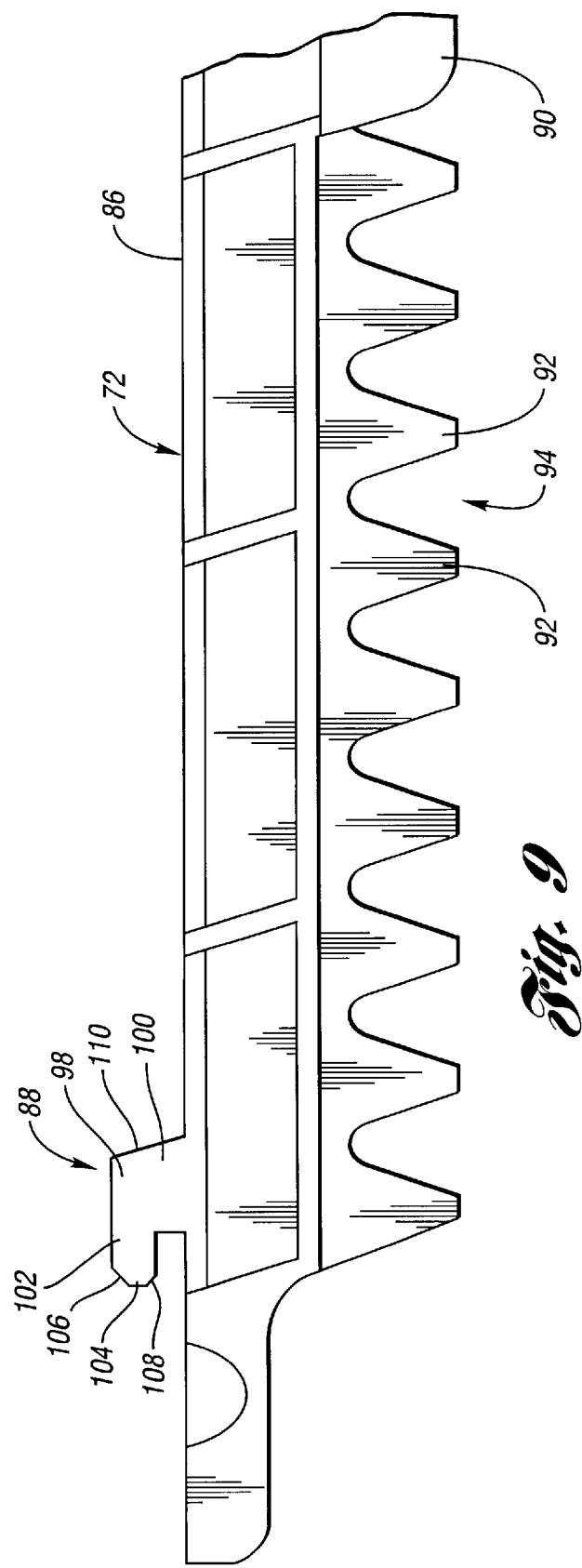

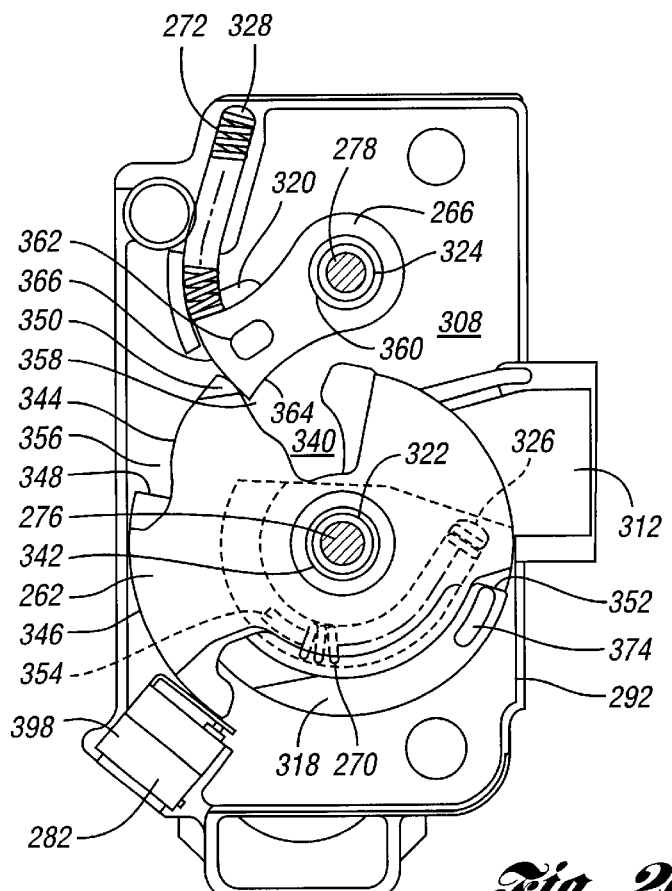
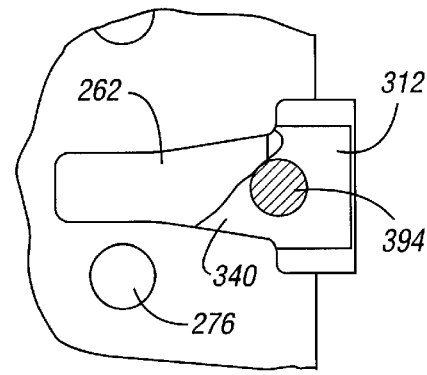
Fig. 20
Fig. 21
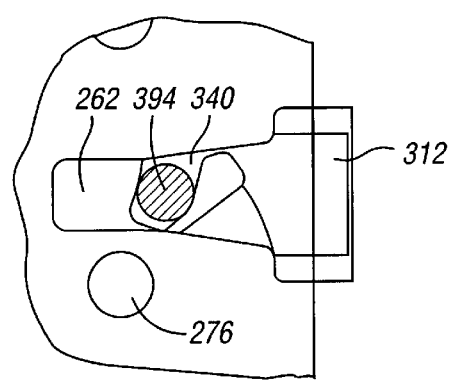
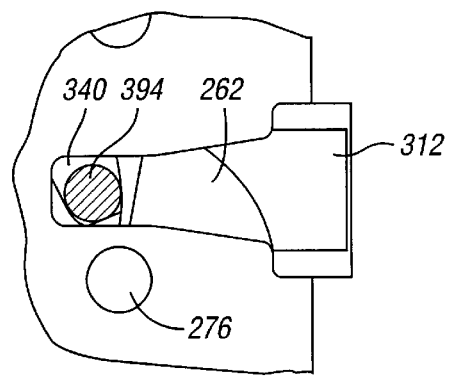
Fig. 22
Fig. 23

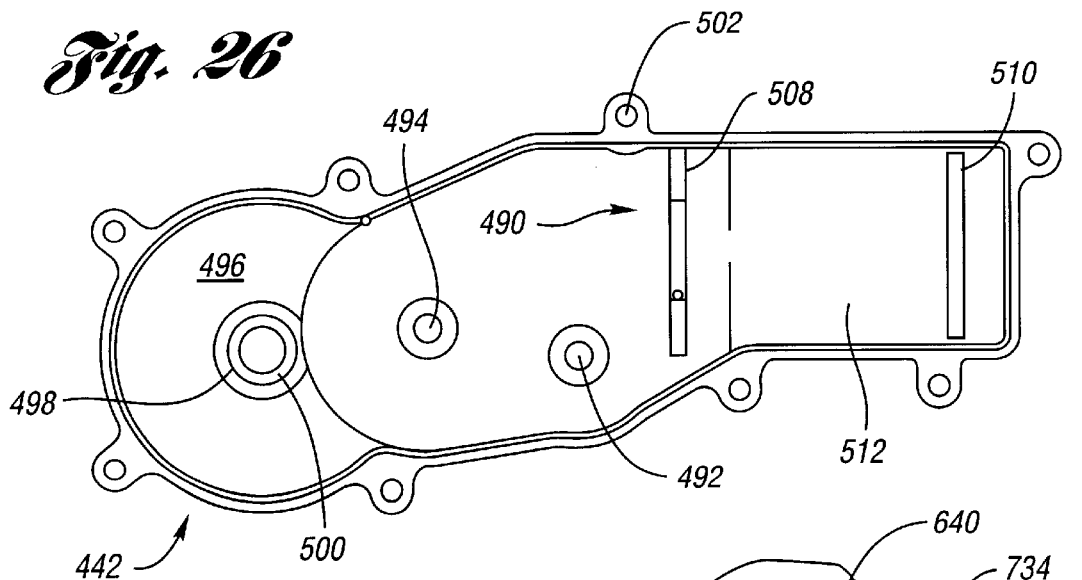

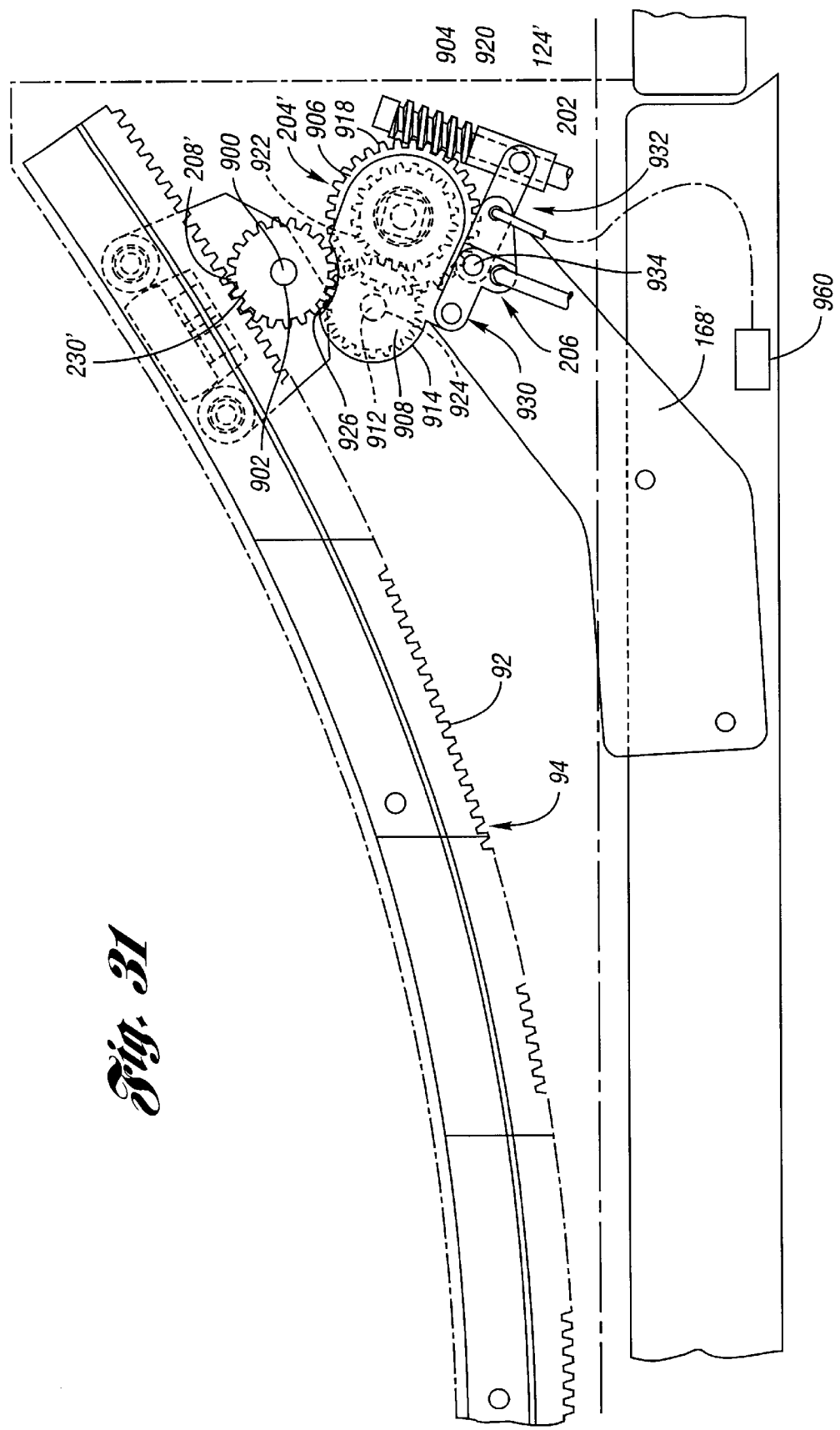

METHOD FOR OPERATING A VEHICLE POWER SLIDING DOOR

BACKGROUND OF THE INVENTION

1. Technical Field

The present invention generally pertains to motor vehicles and more particularly to a vehicle sliding door device. More specifically, but without restriction to the particular embodiment and/or use which is shown and described for purposes of illustration, the present invention relates to a method for controlling a vehicle sliding door device having manual and fully automatic operational modes.

2. Discussion

In various types of motor vehicles, including minivans, delivery vans, and the like, it has become common practice to provide the vehicle body with a relatively large side openings that are located immediately behind the front doors which are opened and closed with a sliding door. The sliding door is typically mounted with hinges on horizontal tracks on the vehicle body for guided sliding movement between a closed position flush with the vehicle body closing the side opening and an open position located outward of and alongside the vehicle body rearward of the side opening. The sliding door may be operated manually, as is most generally the case or with a power operated system to which the present invention is directed.

Commonly assigned U.S. Ser. No. 5,536,061, which is hereby incorporated by reference as if fully set forth herein, discloses a powered sliding side door for a motor vehicle. The door is operated with a power drive mechanism that is pivotally mounted on the door and extends through a side opening in the door. In the exemplary embodiment illustrated, the drive mechanism includes a reversible electric motor that drives a friction wheel which is spring biased to forcibly engage a drive/guide track located beneath the vehicle floor and attached to the vehicle body. The friction drive wheel rides on the drive/guide track to open and close the door and additionally guides and stabilizes its sliding movement.

While the arrangement disclosed in U.S. Pat. No. 5,536,061 provided certain improvements in the pertinent art, several drawbacks have been noted. These drawbacks included, for example, the appearance of the power sliding door, and the cost, reliability and performance of the drive apparatus.

Another type of power sliding side door utilizes a power drive mechanism having a reversible electric motor which is mounted in the vehicle body and connected to operate the door through a cable system. Such an arrangement is disclosed in U.S. Pat. No. 5,833,301. Another type of power sliding door utilizing a rack and a pinion gear to effect the movement of the side door is disclosed in U.S. Pat. No. 4,612,729. Arrangements of both of these types requires considerable accommodating space and modifications to the body structure and are not readily installed in an upgrading manner to convert an existing manually operated sliding door to a power operated sliding door.

Consequently, there remains a need in the art for an improved power sliding door system for a motor vehicle, and a method for controlling same, having improved reliability and performance which may be readily installed in an upgrading manner to convert an existing manually operated sliding door to a power sliding door.

SUMMARY OF THE INVENTION

It is therefore a general object of the present invention to provide an improved control methodology for a power sliding door system.

It is a more specific object of the present invention to provide a control methodology for a power sliding door system which arrests the operation of the sliding door system in a power-assisted mode when any of the handles of the door system are actuated.

It is another object of the present invention to provide a control methodology for a power sliding door system with enhanced child guard features.

It is another object of the present invention to provide a control methodology for a power sliding door system which arrests the operation of the sliding door system in a power assisted-mode when a fuel door is in the path of the sliding door.

It is yet another object of the present invention to provide a control methodology for a power sliding door system which detects the presence of obstacles in the path of the sliding door and inhibits movement of the sliding door in response to the detection of two obstacles.

It is a further object of the present invention to provide a control methodology for a power sliding door system which does not require the door drive means or inertia to actuate the latch mechanism and latch the sliding door.

A method is provided for controlling a power sliding door system having a power drive mechanism for propelling the sliding door and a power latching mechanism for latching the sliding door in a latched condition. The methodology provides enhanced monitoring and control of the power sliding door system to improve the operation of the sliding door in both the power-assisted and manual modes. The control methodology inhibits the operation of the power sliding door system in response to the actuation of any of the sliding door handles or if a fuel door is in the path of the sliding door. The control methodology also inhibits the operation of the sliding door system if a child guard mechanism is enabled. The control methodology includes an obstacle detection routine which detects obstacles in two directions of travel. The control methodology does not require the power drive mechanism or inertia to cause the latch mechanism to latch the sliding door in the latched condition.

Additional advantages and features of the present invention will become apparent from the subsequent description and the appended claims, taken in conjunction with the accompanying drawings.

BRIEF DESCRIPTION OF THE DRAWINGS

FIG. 3B is a bottom view of the light bar shown in FIG. 1;

FIG. 3C is a cross-sectional view of the light bar shown in FIG. 3B taken along the line 3C—3C;

FIG. 8 is a top view of the rack portion of the first guide rail illustrated in FIG. 5;

FIG. 9 is an enlarged view of a portion of the rack portion shown in FIG. 8;

FIG. 20 is a bottom view of the latch mechanism of the present invention with the base portion removed;

FIG. 21 is a side view of the latch mechanism of the present invention with the latch means in the fully open position;

FIG. 22 is a side view similar to that of FIG. 21, showing the latch means in the ajar position;

FIG. 23 is another side view similar to that of FIG. 21, showing the latch means in the fully latched position;

FIG. 26 is a bottom view of the second housing portion;

FIG. 27 is an exploded section view of the second member taken through its center;

FIG. 28 is a top view of a portion of the exterior and interior unlatch levers showing the first and second Bowden cables exploded from their respective cable retention means;

FIG. 29 is an end view of the exterior and interior unlatch levers shown in FIG. 28;

FIG. 30 is a top view of a cable and cable retention means constructed in accordance with an alternate embodiment of the present invention;

FIG. 31 is a top view of the power door drive mechanism according to an alternate embodiment of the present invention;

DETAILED DESCRIPTION OF THE PREFERRED EMBODIMENT

Figure 1:
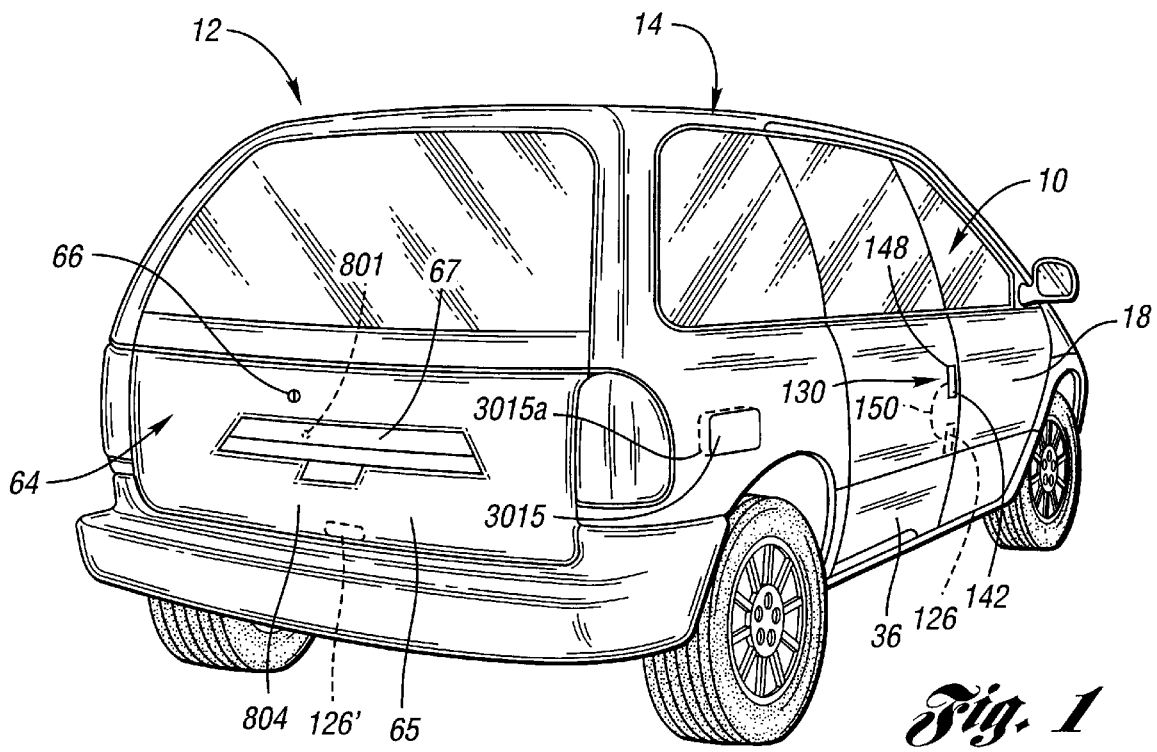
FIG. 1 is a perspective view of a vehicle equipped with a power sliding door system constructed in accordance with the teachings of the present invention shown incorporated into an exemplary motor vehicle.
Figure 2:
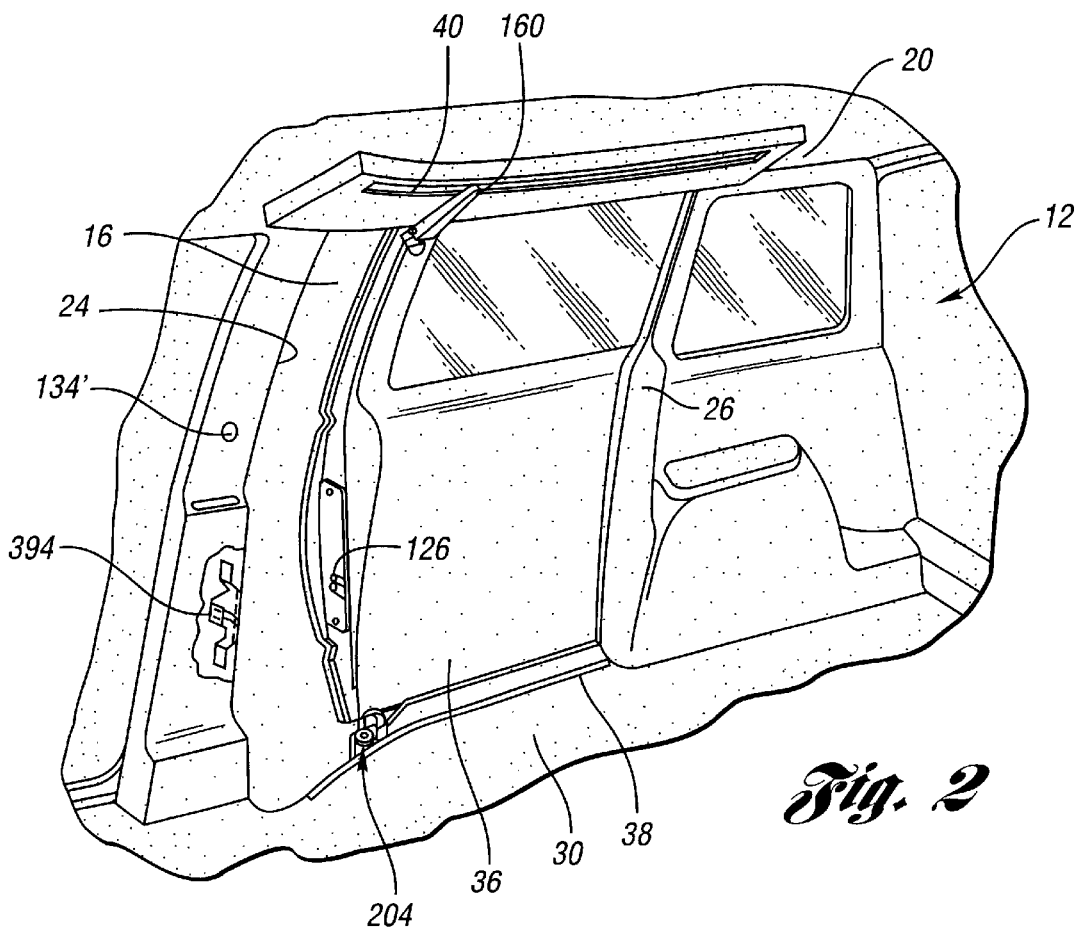
FIG. 2 is a perspective view of a portion of the interior of the vehicle shown in FIG. 1.

With initial reference to FIGS. 1 and 2, a power sliding door system constructed in accordance with the teachings of a preferred embodiment of the present invention is generally identified by reference numeral 10. The power sliding door system 10 is incorporated into a vehicle 12 illustrated as a minivan. However, it will be understood by those skilled in the art that the teachings of the present invention have applicability to other vehicle types in which a sliding door is desired.

Figure 5:
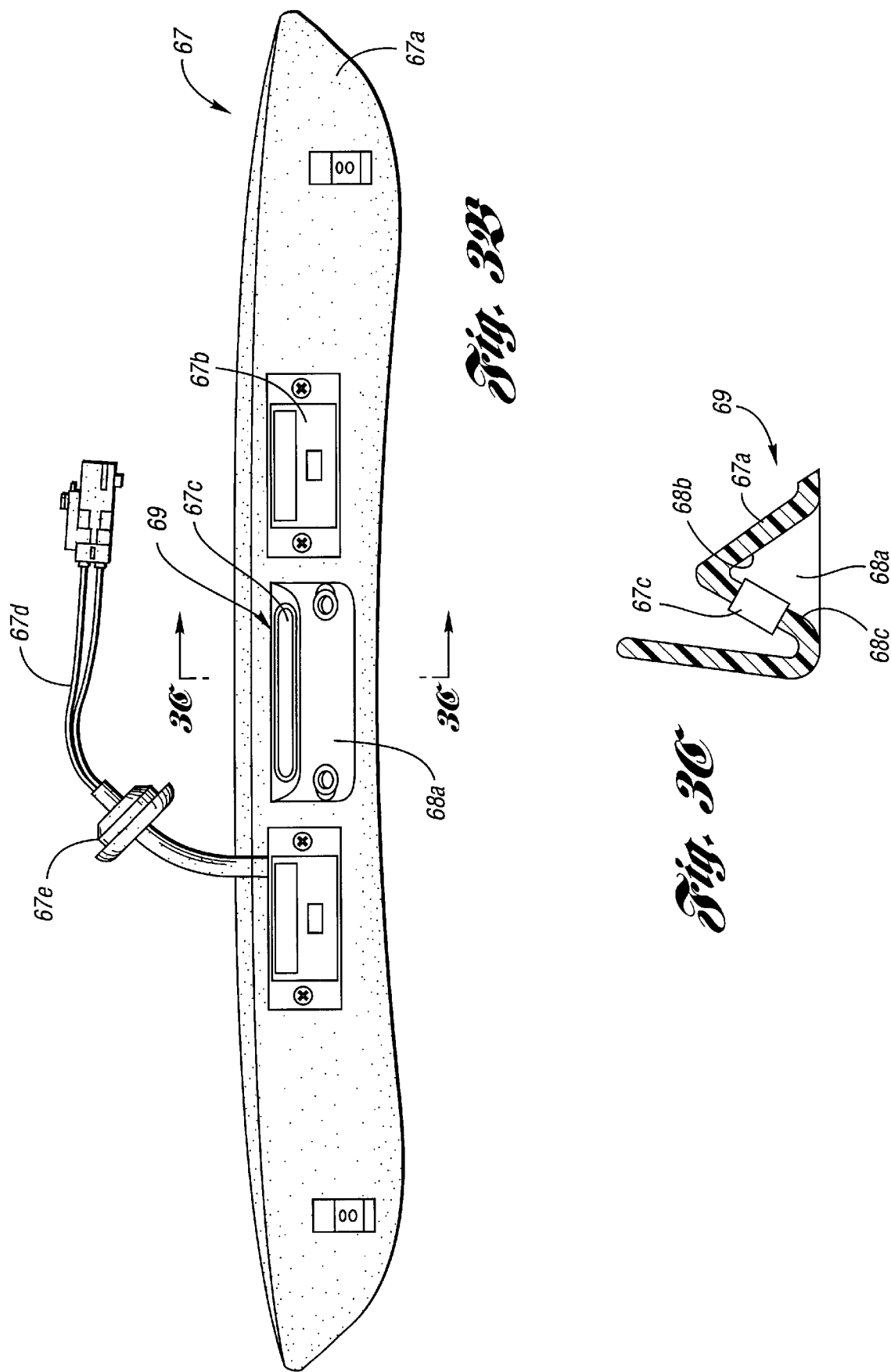
FIG. 5 is a perspective view of a portion of the vehicle illustrated in FIG. 1 shown the door opening with the sliding door in the fully open position.
Figure 6:
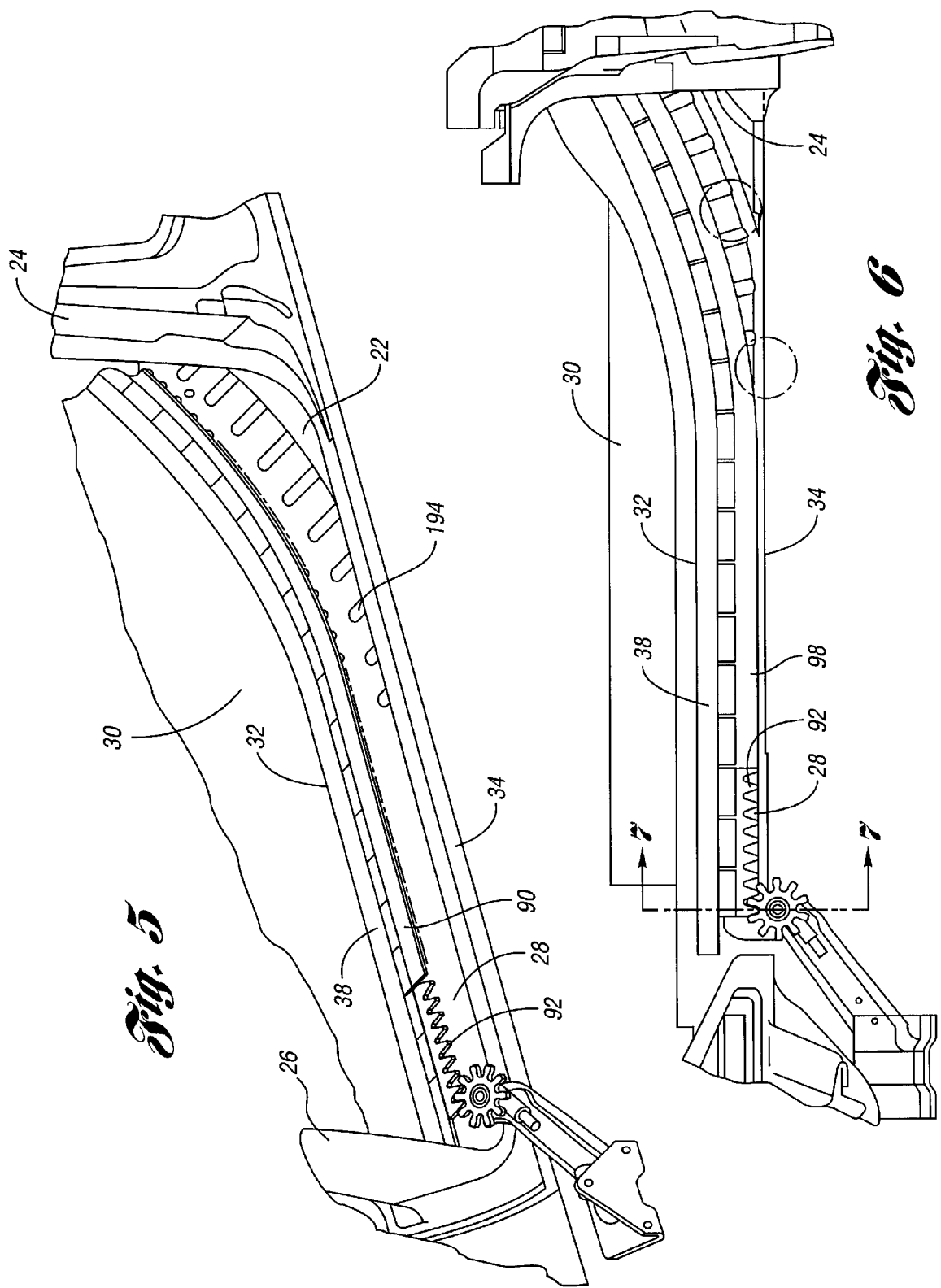
FIG. 6 is a top view of the door opening of FIG. 5.

With additional reference to FIGS. 5 and 6, vehicle 12 is shown to include a vehicle body 14 having a side opening 16 positioned on the right side of vehicle 12 immediately rearward of a forward door 18. Side opening 16 is defined by an upper horizontal channel 20, a lower horizontal channel 22, a first body pillar 24 and a second body pillar 26. Lower horizontal channel 22 includes a door sill 28 formed under the floor 30 of vehicle body 14 between a first sidewall 32 and a second sidewall 34. Side opening 16 is adapted for receiving a sliding door 36, with the sliding door 36 being slidably mounted on a first guide track 38 and a second, conventionally designed guide track 40. While not illustrated, it will be understood that vehicle 12 may be equipped with a substantially identical power sliding door on the left side thereof.

Figure 4:
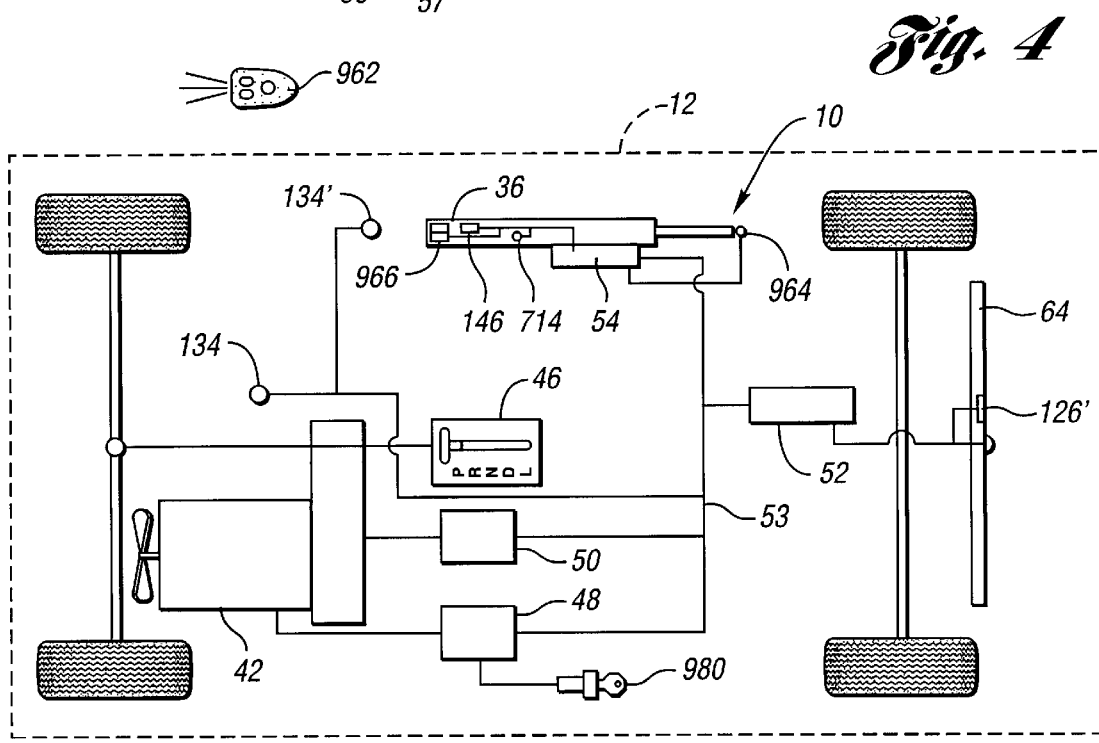
FIG. 4 is a schematic diagram of the vehicle shown in FIG. 1.

With brief reference to FIG. 4, vehicle 12 is schematically illustrated and is shown to include an engine 42, an automatic transmission 44, a gear shift lever 46, an engine controller 48, an automatic transmission controller 50, a body control module 52, the sliding door 36, a data buss 53 and a control module 54. Data buss 53 interconnects engine controller 48, automatic transmission controller 50, body control module 52 and control module 54. Preferably, data buss 53 is a J1850 buss which allows the controllers and control modules to share data on various vehicle dynamics.

Figure 3A:
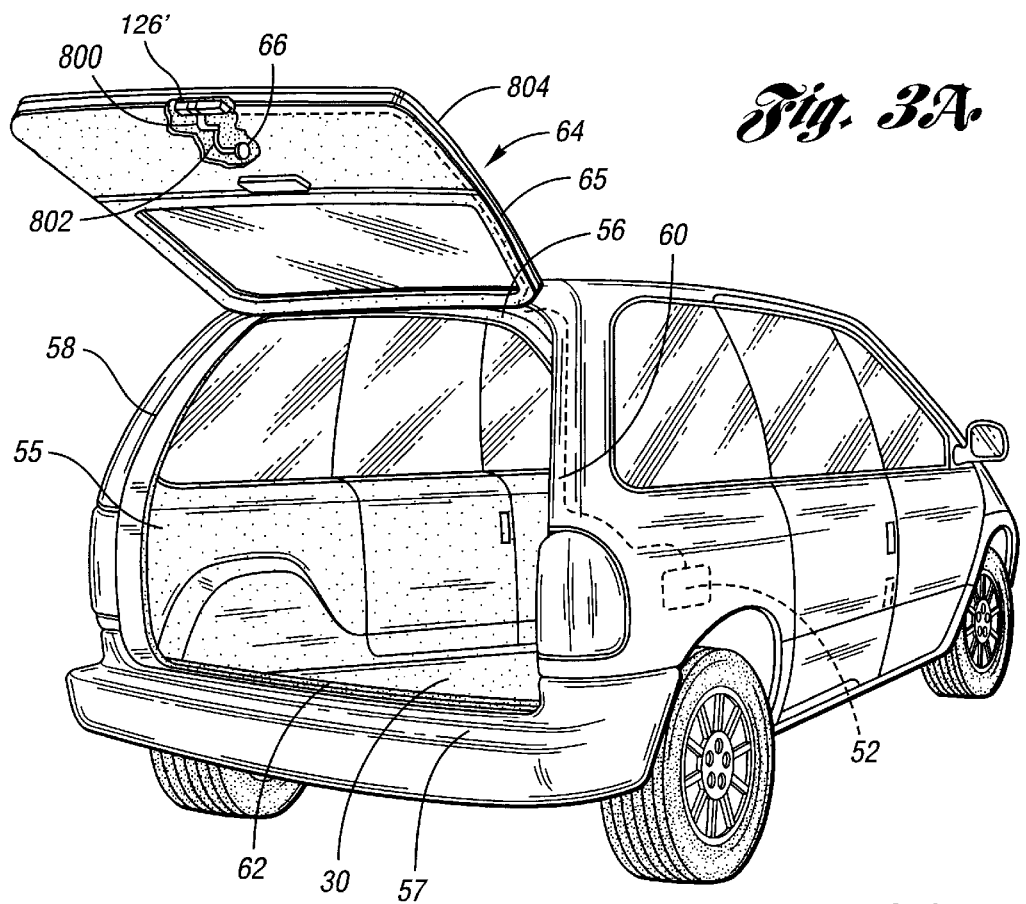
FIG. 3A is a perspective view of the rear of the vehicle shown in FIG. 1 with the rear tailgate in the open position.

Referring back to FIG. 1 and with additional reference to FIGS. 3A through 3C, vehicle body 14 is also shown to include a rear opening 55 positioned on the rear side of vehicle 12. Rear opening 55 is defined by a second upper horizontal channel 56, a second lower horizontal channel 57, a first rear body pillar 58 and a second rear body pillar 60. Second lower horizontal channel 57 includes a rear door sill 62 formed above the floor 30 of vehicle body 14 between a first and second rear body pillars 58 and 60, respectively. Rear opening 55 is adapted for receiving a tailgate 64, with the tailgate 64 being pivotably mounted to second upper horizontal channel 56. Tailgate 64 includes a tailgate panel 65, a key switch 66 and a light bar assembly 67. Tailgate panel 65 is stamped from a metal material or preferably molded from a plastic material. Key switch 66 and light bar assembly 67 are fixedly coupled to tailgate panel 65. Light bar assembly 67 includes a bar portion 67a, a pair of lights 67b, a tailgate handle switch 67c, a wire harness 67d and a resilient sealing grommet 67e.

Bar portion 67a includes a handle aperture 68a having an arcuate first surface 68b in the area across from tailgate handle switch 67c and a substantially flat second surface 68c in the area adjacent tailgate handle switch 67c. The configuration of handle aperture 68a creates an ergonomically shaped and positioned handle 69 with which to manually actuate tailgate 64.

Tailgate handle switch 67c is fixed to bar portion 67a and extends into handle aperture 68a in a manner where it is substantially parallel second surface 68c. Preferably, tailgate handle switch 67c is a paddle-type switch which when actuated is operable for producing a tailgate switch output signal. The paddle-type switch is preferred in that it provides the operator of the vehicle door with the feeling that they are actuating a conventional mechanical door handle.

Figure 7:
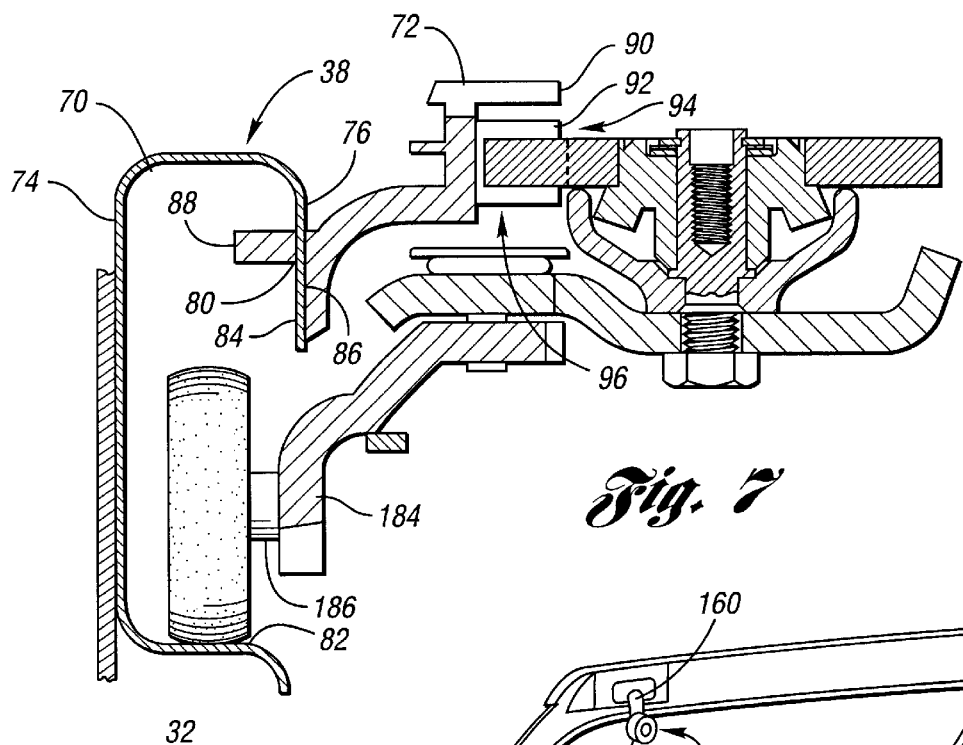
FIG. 7 is a cross-sectional view of the door opening taken along line 7—7 of FIG. 6.

With reference to FIGS. 5 through 7, first guide track 38 is shown to curve inward relative to the interior of vehicle 12 as it approaches first body pillar 24 and generally follows the curved path of first sidewall 32. First guide track 38 includes a channel shaped portion 70 and a rack portion 72. Channel shaped portion 70 formed from a material such as steel, aluminum or plastic and preferably from a material such as nylon. Channel shaped portion 70 includes a first rear abutting surface 74, a front abutting surface 76, a plurality of mounting apertures (not shown), a plurality of generally rectangular tab apertures 80, and first and second guide surfaces 82 and 84, respectively. Channel shaped portion 70 is fixedly secured to second sidewall 32 and floor 30, with a plurality of threaded fasteners (not shown).

Rack portion 72 is preferably formed from a Nylon material, but may also be formed from any other durable plastic material or metal. Rack portion 72 includes a second rear abutting surface 86, a plurality of mounting tabs 88, a dust lip 90 and a plurality of rack teeth 92 which collectively form a rack 94, Rack teeth 92 extend through rack portion 72 along a bottom side 96 but do not extend through dust lip 90. With brief additional reference to FIGS. 8 and 9, mounting tabs 88 are shown to be spaced along the length of second rear abutting surface 86 at predetermined intervals. Each mounting tab 88 includes a generally L-shaped projection 98 having a leg member 100 fixedly coupled to second rear abutting surface 86 and a base member 102 which is spaced apart from second rear abutting surface 86. The tip 104 of base member 102 includes first and second chamfers 106 and 108, respectively. A chamfer 110 is also included on the side of leg member 100. Chamfers 106 and 108, respectively. A chamfer 110 is also included on the side of leg member 100. Chamfers 106, 108 and 110 aid in the assembly of rack portion 72 to channel shaped portion 70 by guiding each mounting tab 88 into its respective tab aperture 80, as well as guiding base member.

Figure 10:
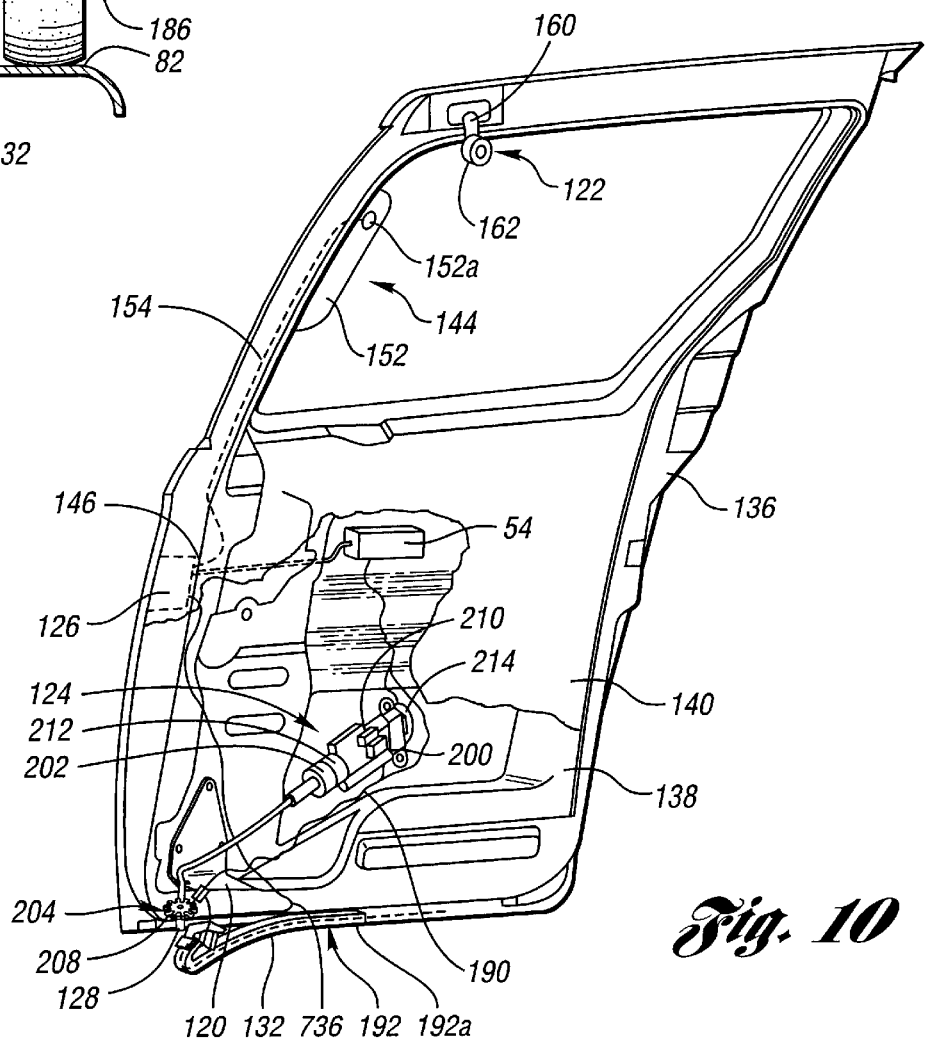
FIG. 10 is a perspective view of the interior side of the power sliding door of FIG. 1 shown partially cut-away.

With reference to FIGS. 1, 2 and 10, sliding door 36 is shown to include a lower mounting assembly 120, an upper mounting assembly 122, a power door drive mechanism 124, a power latching mechanism 126, a hold-open latch, a handle mechanism 130 the control module 54, a wire track assembly 132, a plurality of interior switches 134' and a door assembly 136 having a door panel assembly 138 and a trim panel assembly 140.

Handle mechanism 130 includes an exterior handle assembly 142, an interior handle assembly 144 and a handle switch 146. Exterior handle assembly 142 includes an exterior handle 148 which is fixed to the exterior side of door panel assembly 138. Exterior handle 148 is coupled to power latching mechanism 126 through a first Bowden cable 150 and is operable for unlatching door assembly 136 from first body pillar 24 to allow sliding door 36 to be moved from the closed position as shown in FIG. 1 to the open position as shown in FIG. 2. In the particular embodiment illustrated, exterior handle 148 is operable between a retracted position in which first Bowden cable 150 does not cause power latching mechanism 126 to unlatch, and an extended position in which first Bowden cable 150 causes power latching mechanism 126 to unlatch.

Interior handle assembly 144 includes an interior handle 152 which is fixed to door panel assembly 138 and extends through trim panel assembly 140. Interior handle 152 includes a release button 152a which is coupled to power latching mechanism 126 through a second Bowden cable 154 and is operable for unlatching door panel assembly 138 to allow sliding door 36 to be moved from the closed position to the open position. In the particular embodiment illustrated, release button 152a is operable between an extended position in which second Bowden cable 154 does not cause power latching mechanism 126 to unlatch, and an depressed position in which second Bowden cable 154 causes power latching mechanism 126 to unlatch.

Handle switch 146 is mechanically coupled to handle mechanism 130 and is operable for producing a handle signal that indicates that one of the exterior and interior handles 148 and 152, respectively, have been moved from their retracted positions toward their extended positions.

Hold-open latch 128 is pivotably coupled to lower mounting assembly 120 and is operable for mechanically engaging first guide track 38 when sliding door 36 is positioned at the fully open position to inhibit sliding door 36 from closing. Accordingly, hold-open latch 128 may include a latching element (not shown) for selectively engaging first guide track 38. Hold-open latch 128 is caused to release first guide track 38 through the operation of handle mechanism 130 or power latching mechanism 126.

As best shown in FIG. 10, upper mounting assembly 122 is attached to an upper forward corner of sliding door 36 relative to the front of vehicle 12. Upper mounting assembly 122 includes an upper hinge member 160 which is fixedly coupled to door panel assembly 138 and an upper guide roller 162 which is rotatably coupled to upper hinge member 160 and adapted for cooperation with second guide track 40. Lower mounting assembly 120 is attached to a lower forward corner of sliding door 36 relative to the front of vehicle 12. As best shown in FIGS. 11 through 14, lower mounting assembly 120 is shown to include a lower hinge member 168, first and second lateral guide rollers 170 and 172, respectively, a vertical guide roller 174 and a articulating head 176. The articulating head 176 is pivotably attached to the end of the lower hinge member 168 by a pivot pin 178. Articulating head 176 is generally U-shaped, having a pair of furcations 180 and 180' which extend below lower hinge member 168. Furcations 180 and 180' each include a cylindrical aperture (not shown) for receiving a vertically extending roller pin 182, each one of which journally supports one of the first and second lateral guide rollers 170 and 172. A tongue 184 extends in a perpendicular direction between furcations 180 and 180' includes a cylindrical aperture (not shown) for receiving a horizontally extending roller pin 186 which journally supports the vertical guide roller 174.

The lower mounting assembly 120 is adapted for cooperation with the first guide track 38 wherein the vertical guide roller 174 contacts first guide surface 82 and first and second lateral guide rollers 170 and 172 contact second guide surface 84. As such, cooperation between the guide rollers and their respective guide surfaces ensures proper vertical and lateral alignment of lower mounting assembly 120 to rack 94. Since the articulating head 176 is pivotably attached to the lower hinge member 168, rollers 170, 172 and 174 are capable of traversing the curved length of first guide track 38.

A detailed description of wire track assembly 132 is beyond the scope of the present invention and need not be provided herein. Briefly, wire track assembly 132 is operative for providing electrical power from vehicle body 14 to sliding door 36 and, as shown in FIG. 10, includes a wire harness 190 having a plurality of wires which are enclosed in a limiter 192. Wire harness 190 is operable for electronically coupling control module 54 and body control module 52 to permit the exchange of electronic signals therebetween, as well as for supplying electric current to power door drive mechanism 124, power latching mechanism 126 and control module 54.

Limiter 192 is comprised of numerous main track links 192a. Limiter 192 is described in more detail in commonly assigned U.S. Ser. No. 09/211,729, filed Dec. 15, 1998, which is hereby incorporated by reference as if fully set forth herein. With additional reference to FIG. 5, a plurality of protrusions 194 are included along the length of door sill 28 to assist in guiding wire track assembly 132 when sliding door 36 moves between the closed position and the fully open position. Insofar as the present invention is concerned, it will be understood that electric power is preferably hard wired from vehicle body 14 to sliding door 36 in such a manner. However, electric power may alternatively be routed to sliding door 36 through sliding contacts or other manners well known in the art.

Referring now to FIGS. 10 through 13, power sliding door system 10 is shown to include a power door drive mechanism 124 mounted within sliding door 36. In the preferred embodiment, power door drive mechanism includes a power unit 200, a flexible driveshaft 202, a drive unit 204, a drive clutch 206 and a drive pinion 208. Power unit 200 includes a drive motor 210, a gearbox 212 and a Hall effect sensor 214.

Flexible driveshaft 202 includes a hollow non-rotating member 216 and a cylindrical drive member 218 which is disposed within non-rotating member 216. Cylindrical drive member 218 is coupled to an output member of gearbox 212 at a first end and to an input member of drive unit 204 at a second end. Drive torque from gearbox 212 is transmitted from the gearbox output member through cylindrical drive member 218 into drive unit 204 where it is received by an input member (not shown).

Drive unit 204 and non-rotating member 216 are fixedly coupled to lower hinge member 168. Drive unit 204 includes a torque input axis which is coaxial with its input member, a torque output axis which is coaxial with its output shaft 220 and drive pinion 208, and a gear train (not shown) which is operable for changing the direction of the rotational energy between the input and output axes. Drive pinion 208 includes a plurality of spur gear teeth 230 which meshingly engage rack teeth 92. As such, drive pinion 208 rotates when sliding door 36 is moved relative to vehicle body 14 or vice versa.

Preferably, drive motor 210, gearbox 212 and drive unit 204 cooperate to provide drive pinion 208 with sufficient drive torque to enable sliding door 36 to operate while vehicle 12 is on 20% fore and aft grades with a velocity approximately 0.7 to 1.5 m/s. Drive clutch 206 is preferably an electromagnetic clutch 213 coupled to gearbox 212 and flexible driveshaft 202 which is operable between a disengaged position wherein the transmission of drive torque between drive motor 210 and drive pinion 208 is inhibited, and an engaged position wherein the transmission of drive torque between drive motor 210 and drive pinion 208 is permitted. Preferably, drive clutch 206 is normally maintained in the disengaged position which prevents drive pinion 208 from back-driving drive motor 210 when sliding door 36 is manually moved between the fully-open and closed positions. Configuration in this manner permits sliding door 36 to be opened and closed manually without substantially increasing the force required to propel the door as compared to a completely manual sliding door. Hall effect sensor 214 is operable for generating a position signal indicative of the position of drive motor 210 at a predetermined position. Hall effect sensor 214 is coupled to control module 54, enabling control module 54 to receive the position signal and monitor the operation of drive motor 210, including the speed by which it rotates.

Figure 11:
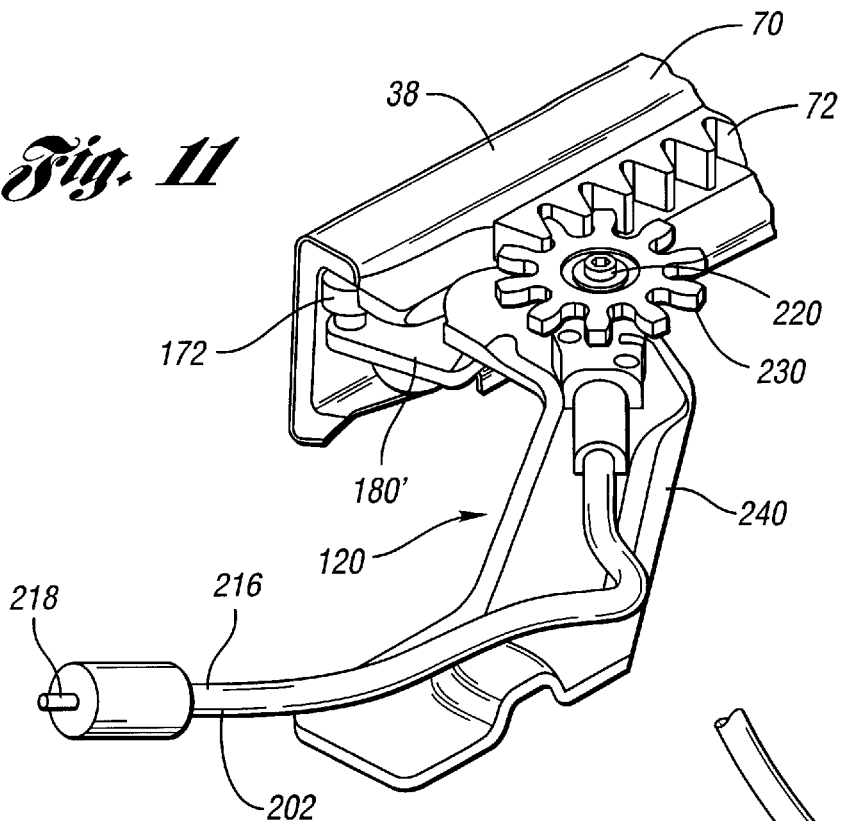
FIG. 11 is a top perspective view of a portion of the lower mounting assembly and power door drive mechanism coupled to the first guide track.
Figure 12:
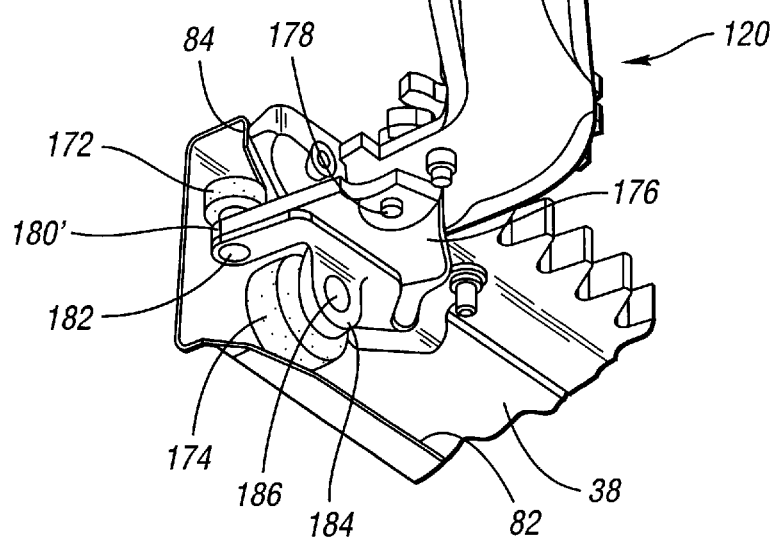
FIG. 12 is a bottom perspective view of a bottom portion of the lower mounting assembly and power door drive mechanism coupled to the first guide track.
Figure 13:
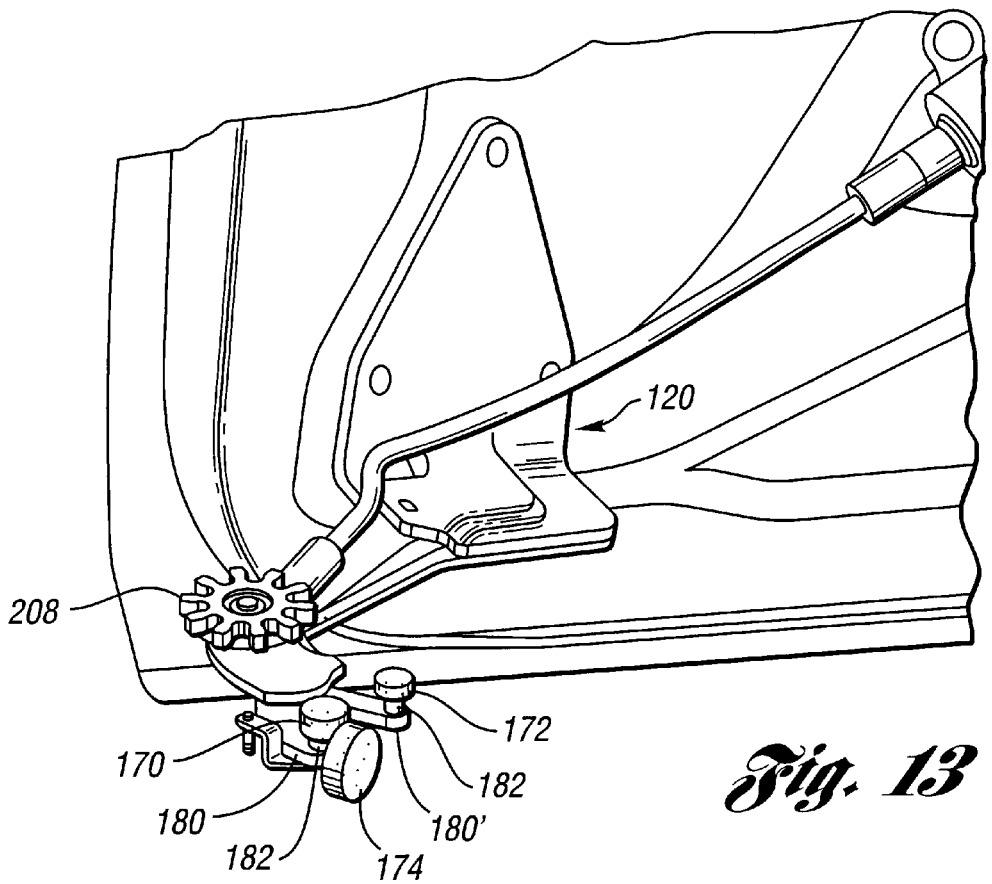
FIG. 13 is a perspective view of a portion of the lower front corner of the door assembly shown in FIG. 10.
Figure 14:
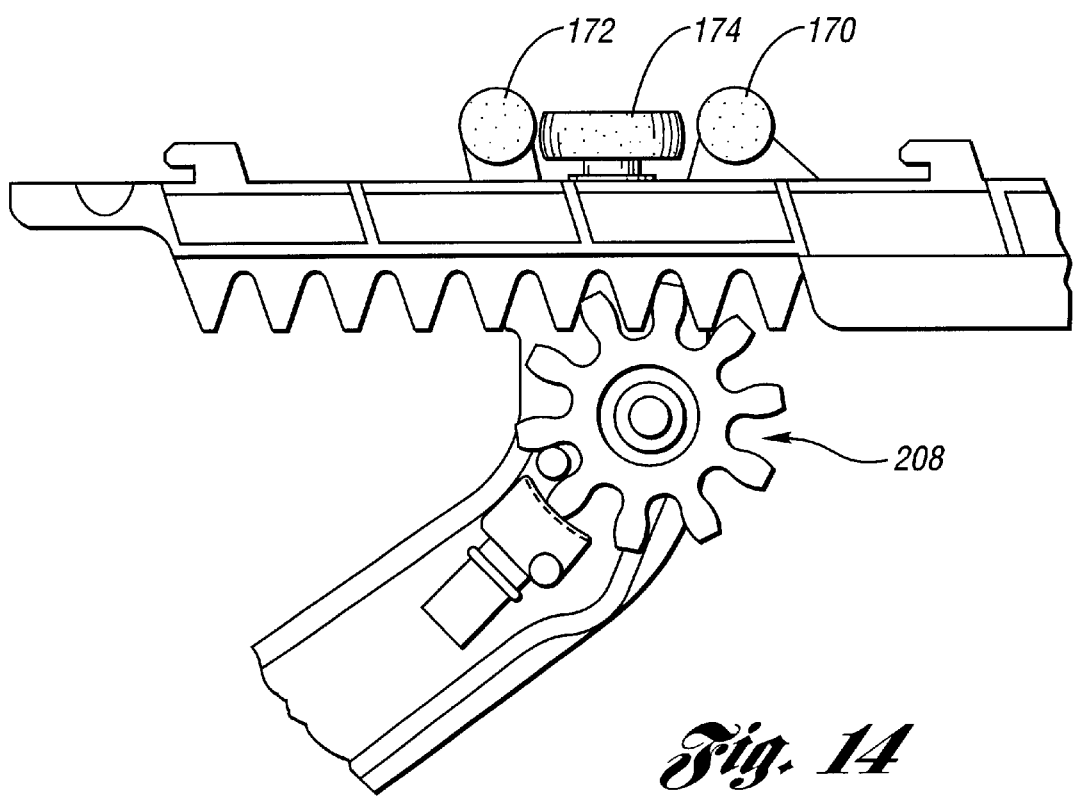
FIG. 14 is a top view of a portion of the power door drive mechanism meshingly engaged with the rack portion.

As shown most particularly in FIG. 11, lower hinge member 168 includes a raised portion 240 which extends around drive pinion 208 and flexible driveshaft 202. Raised portion 240 functions as a guard to prevent foreign objects from contacting spur gear teeth 230 of drive pinion 208 as it rotates, as well as providing drive pinion 208 and flexible driveshaft 202 with additional protection against impacts caused by persons or equipment entering or exiting vehicle 12 through side opening 16, as well as providing structural strength to lower hinge member 168.

With reference to FIGS. 15–23, power latching mechanism 126 is illustrated to include a latch mechanism 250, a power drive assembly 252, a bracket member 254, an unlatch mechanism 256 and a child guard mechanism 258. Latch mechanism 250 is shown to include a housing 260, a latch ratchet 262, a latch sector 264, a pawl 266, a dog member 268, first, second and third spring means 270, 272 and 274 respectively, first and second pins 276 and 278, respectively, a pawl switch 280, a ratchet switch 282 and a lock switch 714.

Figure 16:
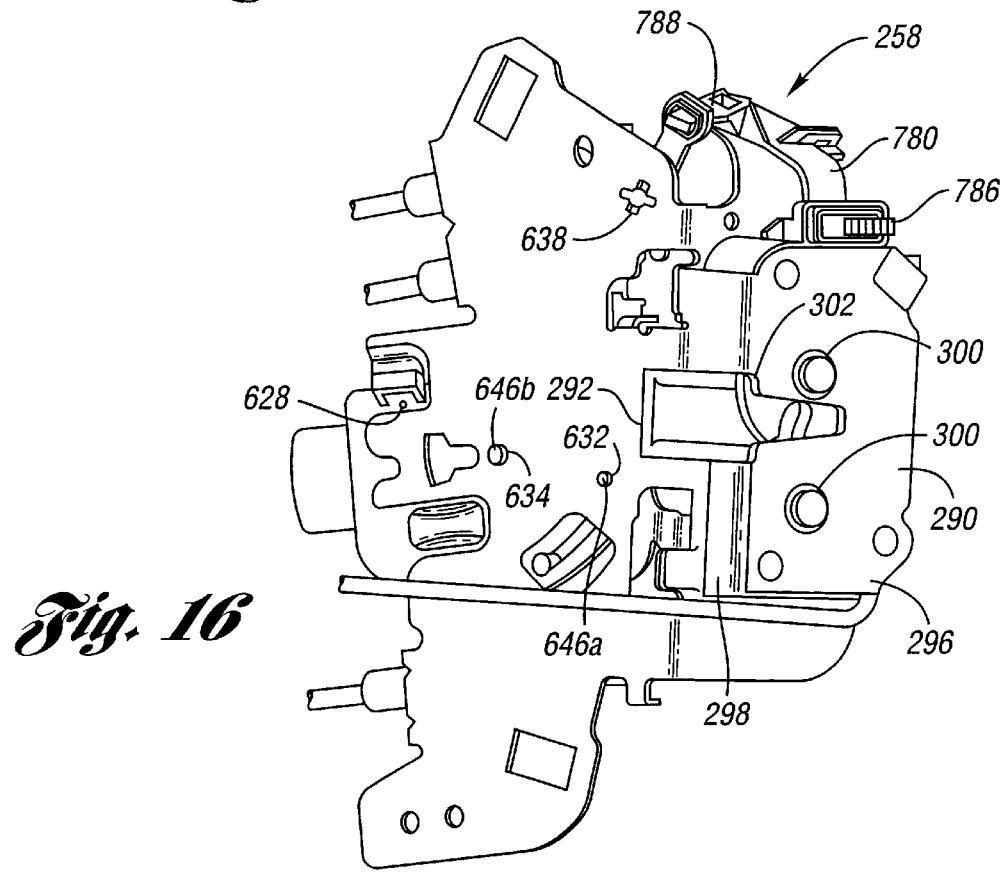
FIG. 16 is a perspective view of the front of the power latching mechanism illustrated in FIG. 15.
Figure 17A:
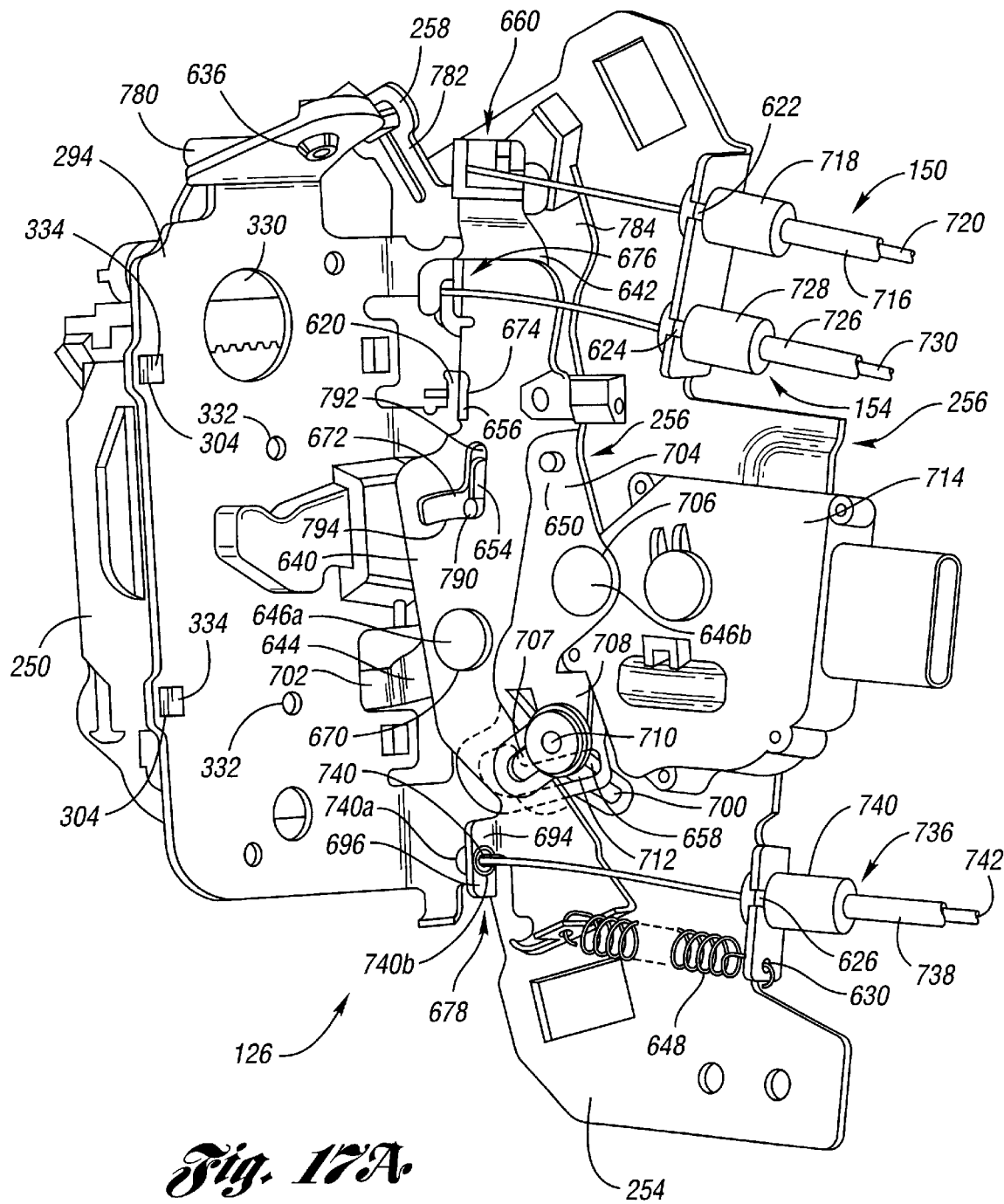
FIG. 17A is a perspective view similar to that of FIG. 15, illustrated with the power drive assembly removed for purposes of illustration.

Housing 260 includes a container-like base portion 290, a molded body portion 292 and a cover 294. With particular reference to FIGS. 16 through 18, base portion 290 is shown to include a front surface 296, a side surface 298, a pair of pin apertures 300 sized to receive first and second pins 276 and 278, a slotted aperture 302 formed into front and side surfaces 296 and 298 and a plurality of retaining tangs 304. Body portion 292 includes a mid-wall 306 defining first and second cavities 308 and 310, respectively, a striker receiver 312, first and second pin apertures 314 and 316, respectively, sized to receive first and second pins 276 and 278, respectively, a contact tab aperture 318 and a pawl actuation aperture 320. First cavity 308 includes a first boss 322, a second boss 324 and first and second spring apertures 326 and 328, respectively. Second boss 324 extends through midwall 306 into second cavity 310. Cover 294 includes a drive aperture 330, a pair of pin apertures 332 sized to receive first and second pins 276 and 278 and a plurality of tang apertures 334 sized to receive retaining tangs 304.

As shown particularly in FIGS. 20–22, latch ratchet 262 is a disc-shaped fabrication which includes a slotted striker aperture 340, a first boss aperture 342, a pawl contact surface 344 having first, second and third pawl contact portions 346, 348 and 350, respectively, a latch sector contact surface 352, a spring tab 354 and first and second pawl apertures 356 and 358, respectively. Latch ratchet or member 262 is coupled to body portion 292 in first cavity 308 such that first boss 322 extends through first boss aperture 342. First spring means 270 is disposed within first spring aperture 326 and contacts spring tab 354 to thereby normally urge latch ratchet 262 clockwise (as shown in FIG. 20) into a fully unlatched position. First pawl contact portion 346 is configured to contact ratchet switch 282 when pawl 266 is engaged against either second or third pawl contact portions 348 and 350.

Pawl 266 includes a second boss aperture 360, a coupling aperture 362, and first and second contact surfaces 364 and 366, respectively. Pawl 266 is coupled to body portion 292 in first cavity 308 such that second boss 324 extends though second boss aperture 360. Second spring means 272 is disposed within second spring aperture 328 and contacts pawl 266 along a side opposite first contact surface 364. Second spring means 272 urges pawl 266 against pawl contact surface 344, causing pawl 266 to rotate toward latch ratchet 262 when positioned proximate one of the first and second pawl apertures 356 and 358. As first spring means 270 urges latch ratchet 262 in an opposite direction, contact between latch ratchet 262 and pawl 266 is maintained between second pawl contact portion 366 and second pawl contact portion 348 when pawl 266 is positioned in first pawl aperture 356, thereby locking latch ratchet 262 in an ajar position. Similarly, contact between latch ratchet 262 and pawl 266 is maintained between third pawl contact portion 350 and second contact surface 366 when pawl 266 is positioned in second pawl aperture 358, thereby locking latch ratchet 262 in a fully latched position.

Latch sector 264 includes a cylindrical body portion 370 having a pin aperture 372, a contact tab 374, a geared surface 376 having a plurality of gear teeth 378, and a ratchet contact 380. First pin 276 couples latch sector 264 to housing 260. First pin 276 supports latch sector 264 for rotation about first pin 276 between a returned position and an extended position as shown in FIG. 16. Third spring means 274 is coupled to latch sector 264 and body portion 292 and is operable for normally urging latch sector 264 to rotate about first pin 276 to the returned position. Geared surface 376 is proximate drive aperture 330 and allows latch ratchet 262 to be rotated about first pin 276 by a power drive assembly 252. Contact tab 374 extends through contact tab aperture 318 such that rotation of latch sector 264 about first pin 276 in a first direction permits contact tab 374 to contact latch sector contact surface 352 and rotate latch ratchet 262 toward the fully latched position.

Dog member 268 includes an actuation arm 382, a third boss aperture 384, a pawl arm 386, a sensor arm 388, and a ratchet contact surface 390. Actuation arm 382 includes a lever aperture 392. Dog member 268 is coupled to body portion such that second boss 324 extends through third boss aperture 384. Pawl arm 386 extends through pawl actuation aperture 320 and is received into coupling aperture 362 to couple dog member 268 and pawl 266 for rotation about second boss 324. Dog member 268 is therefore operable for rotating pawl 266 outward from latch ratchet 262 to disengage pawl 266 from first and second pawl apertures 356 and 358 to permit latch ratchet 262 to return to the fully unlatched position. Actuation arm 382 cooperates with unlatch mechanism 256 to cause dog member 268 to rotate about second boss 324 to unlatch latch ratchet 262. Latch sector 264 is also operable for rotating dog member 268 about second boss 324 to unlatch latch ratchet 262. Rotation of latch sector 264 in a second direction opposite the first direction enables ratchet contact 280 to contact ratchet contact surface 390 to cause dog member 268 to rotate pawl 266 and unlatch latch ratchet 262. Sensor arm 388 is configured to contact pawl switch 280 when pawl 266 is engaged in either of the first and second pawl apertures 356 and 358.

First and second pins 276 and 278 extend through their respective pin apertures in base portion 290, body portion 292 and cover 294. Retaining tangs 304 extend through their respective tang apertures 334 and are preferably bent over to secure base portion 290 to cover portion 294. Alternatively, retaining tangs 304 may also be welded cover portion 294.

Slotted striker aperture 340 is sized to receive a striker 394 and is operable between a fully unlatched position as shown in FIG. 21, an ajar or partially latched position as shown in FIG. 22, and a fully latched position as shown in FIG. 23. Slotted striker aperture 340 is configured in a manner which permits latch ratchet 262 to rotate toward the fully latched position when striker 394 contacts slotted striker aperture 340. As such, latch ratchet 262 can be actuated to the fully latched position by manually placing sliding door 36 into the closed position.

Pawl switch 280 is coupled to control module 54 and is operative for producing a digital signal indicative of the position of latch ratchet 262. In the particular embodiment illustrated, pawl switch 280 is shown to be a limit switch 396. However, it will be understood that other switches, such as proximity switches, may also be used to generate a signal indicative of the position of latch ratchet 262. When the signal produced by pawl switch 280 is high (i.e., open to ground), pawl 266 is engaged in one of the first and second pawl apertures 356 and 358, indicating that latch ratchet 262 is in one of the ajar and fully latched positions. When the signal produced pawl switch 280 is low (i.e., closed to ground), latch ratchet 262 is in the fully unlatched position.

Ratchet switch 282 is also coupled to control module 54 and produces a digital signal indicative of the position of latch ratchet 262. In the particular embodiment illustrated, ratchet switch 282 is similarly shown to be a limit switch 398. Again, it will be understood that other switches, such as proximity switches, may also be used to generate a signal indicative of the position of latch ratchet 262. When the signal produced by ratchet switch 282 is high, latch ratchet 262 is in the fully latched position. When the signal produced by ratchet switch 282 is low, latch ratchet 262 is in one of the ajar and fully unlatched positions.

Control module 54 utilizes the signals from ratchet switch 282 and pawl switch 280 to determine the position of sliding door 36 relative to striker 394. For example, if both the signals produced by pawl and ratchet switches 280 and 282, respectively, are low, power latching mechanism 126 is in the fully unlatched position. If the signal produced by pawl switch 280 is high and the signal produced by ratchet switch 282 is low, power latching mechanism 126 is in the ajar position. If both the signals produced by pawl and ratchet switches 280 and 282, respectively, are high, power latching mechanism 126 is in the fully latched position.

Figure 15:
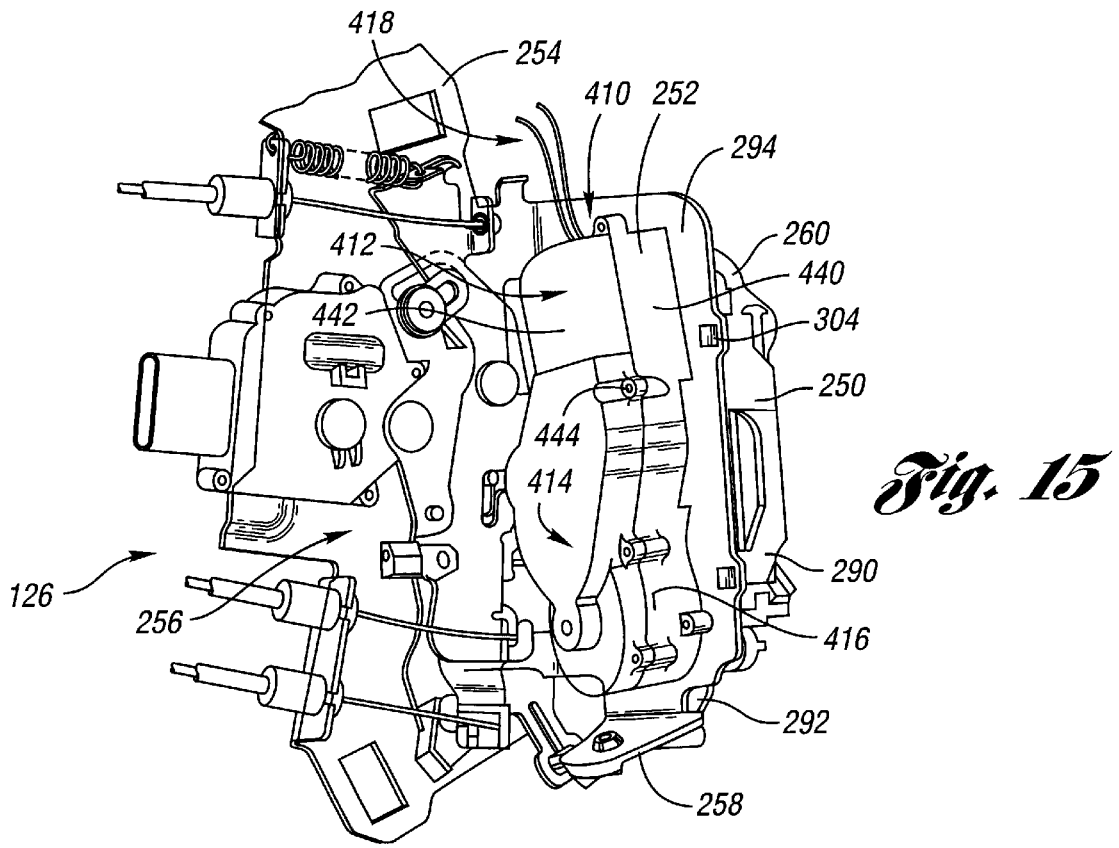
FIG. 15 is a perspective view of the rear of the power latching mechanism of the present invention.
Figure 24:
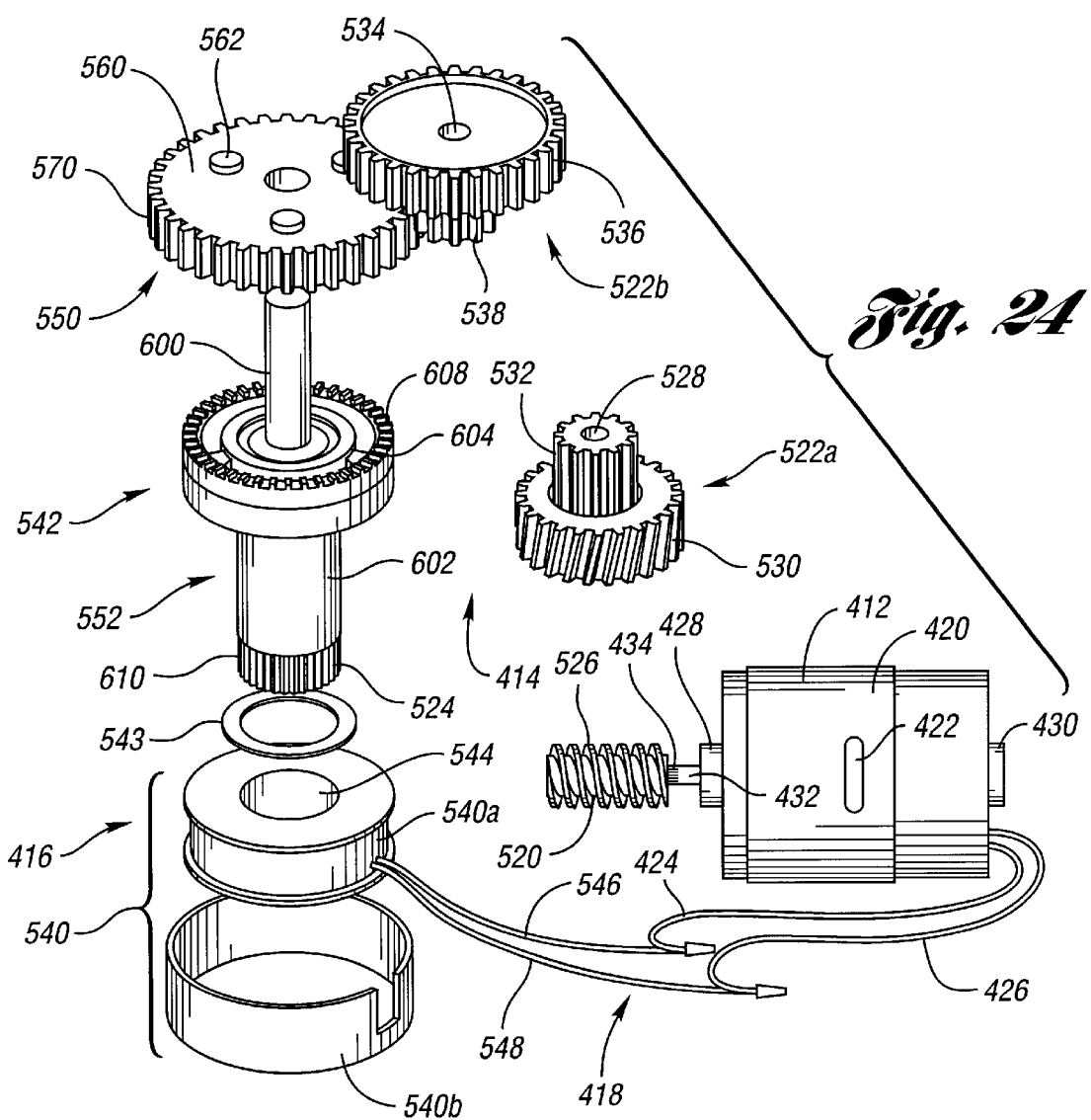
FIG. 24 is an exploded perspective view of a portion of the power drive assembly.

With particular reference to FIGS. 15 and 24, power drive assembly 252 is shown to include a housing 410, a cinch motor 412, a gear train 414, a cinch clutch 416 and a wiring harness 418. Cinch motor 412 is operable in a first rotational direction and a second rotational direction. Cinch motor 412 includes a body portion 420 having a plurality of retaining slots 422, first and second power terminals 424 and 426, respectively, first and second body journals 428 and 430, respectively, and an output shaft 432. First and second body journals 428 and 430 extend from body portion 420 and are coaxial to both body portion 420 and output shaft 432.

Output shaft 432 includes a plurality of longitudinally splined teeth 434 at the end opposite body portion 420.

Figure 25:
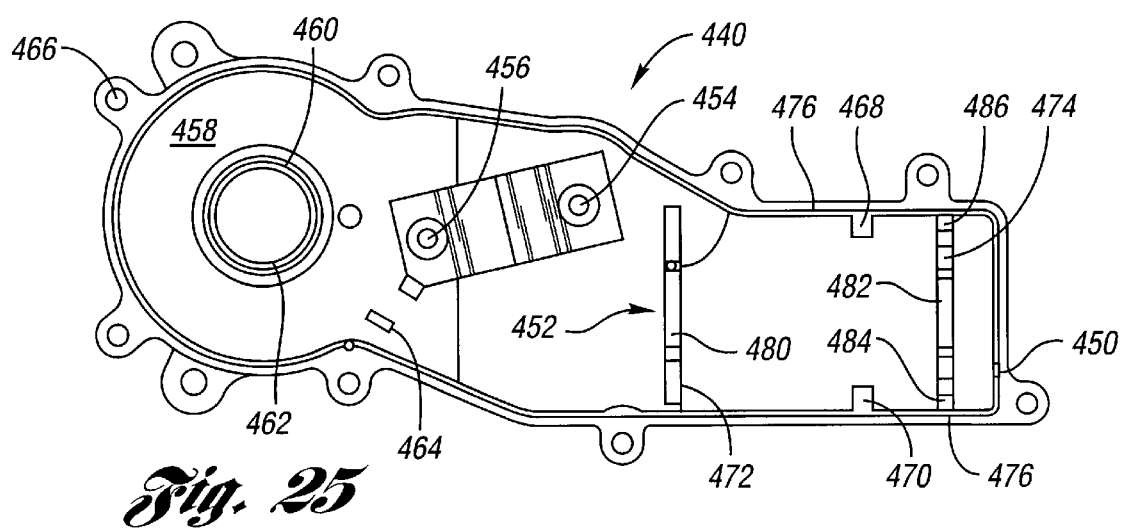
FIG. 25 is a top view of the first housing portion.

Housing 410 includes a first housing portion 440, a second housing portion 442 and a plurality of threaded fasteners 444 to couple first and second housing portions together. With additional reference to FIG. 25, first housing portion 440 is shown to include a wiring aperture 450, motor support means 452, first and second gear axles 454 and 456, respectively, a cylindrical recess 458, a bushing aperture 460, a hollow cylindrical bushing 462, a wire harness stop 464 and a plurality of retaining apertures 466. Motor support means 452 includes first and second retaining tabs 468 and 470, respectively, and first and second support tabs 472 and 474, respectively. First and second retaining tabs 468 and 470 each extend inward from a sidewall 476 which bounds first housing portion 440 along its sides. Retaining tabs 468 and 470 engage retaining slots 422 and are operable for preventing body portion 420 from rotating relative to first housing portion 440. First support tab 472 extends upward from the base 478 of first housing portion 440 and includes a slotted aperture 480 which is sized to receive first body journal 428. Second support tab 474 extends upward from base 478 and is coupled to sidewall 476 in two locations. Second support tab 474 includes a slotted aperture 482 sized to receive second body journal 430, a first vertical slot 484 sized to receive a portion of wiring harness 418 and first power terminal 424, and a second vertical slot 486 sized to receive second power terminal 426. First and second support tabs 472 and 474 cooperate to align the axis of output shaft 432 as well as the position of drive motor 210 in their proper orientations relative to first gear axle 454.

With reference to FIG. 26, second housing portion 442 is shown to include a motor entrapment means 490, first and second axle bores 492 and 494, respectively, a cylindrical recess 496, a bushing aperture 498, a hollow cylindrical bushing 500 and a plurality of retention apertures 502. First and second axle bores 492 and 494 are sized to receive first and second gear axles 454 and 456, respectively. Motor entrapment means 490 includes first and second tabs 508 and 510 extending from the top surface 512 of second housing portion 442. First and second tabs 508 and 510 are positioned along top surface 512 so as to be proximate first and second support tabs 472 and 474, respectively when first and second housing portions 440 and 442 are coupled together. As such, first and second tabs 508 and 510 are operable for limiting the movement of first and second body journals 428 and 430, respectively to thereby control the orientation of output shaft 432 relative to first gear axle 454.

Referring back to FIG. 24, gear train 414 is shown to include a worm gear 520 and a plurality of reducing gears 522a and 522b which cooperate to drive an output pinion 524. Worm gear 520 is conventional in construction and includes thread like teeth 526 and a central aperture (not shown). Worm gear 520 is pressed onto output shaft 432 and engages splined teeth 434 to prevent relative rotation between worm gear 520 and output shaft 432. As such, worm gear 520 is coupled for rotation with output shaft 432.

Reducing gear 522a includes an axle aperture 528, a plurality of helical gear teeth 530 having a first pitch diameter and a plurality of spur gear teeth 532 having a second, smaller pitch diameter. First gear axle 454 extends through axle aperture 528 and helical gear teeth 530 meshingly engage thread-like teeth 526. As such, rotation of worm gear 520 causes reducing gear 522a to rotate about first gear axle 454.

Reducing gear 522b includes an axle aperture 534, a plurality of first spur gear teeth 536 having a first pitch diameter, and a plurality of second spur gear teeth 538 having a second, smaller pitch diameter. Second gear axle 456 extends through axle aperture 534 and first spur gear teeth 536 meshingly engage spur gear teeth 532. As such, rotation of reducing gear 522a causes reducing gear 522b to rotate about second gear axle 456.

Cinch clutch 416 is operable for interrupting the transfer of drive torque from cinch motor 412 to output pinion 524. Preferably, cinch clutch 416 permits output pinion 524 to freely rotate about its axis when cinch clutch 416 is disengaged. Operation in this manner permits power latching mechanism 126 to be operated manually or automatically.

Cinch clutch 416 is preferably electronically controlled and includes an electromagnet 540, a selectively engagable reducing gear 542 and a low friction element 543 disposed between electromagnet 540 and selectively engagable reducing gear 542. Electromagnet 540 is generally cylindrical in shape and includes an inductive coil 540a and a casing 540b. Inductive coil 540a is shown to include a central aperture 544 and positive and negative power leads 546 and 548, respectively. Electromagnet 540 and cinch motor 412 are coupled to wire harness 418 in a parallel manner such that activation of cinch motor 412 also activates electromagnet 540. Wire harness stop 464 is operable for preventing gear teeth 538 from contacting wire harness 418 to ensure reliable operation of electromagnet 540.

Selectively engagable gear mechanism 542 includes first and second members 550 and 552, respectively. With additional reference to FIG. 27, first member 550 is shown to include a first gear member 560, a second gear member 562, a washer 564, a spring means 566 and a retaining ring 568. First gear member 560 is generally cylindrical in shape and includes a plurality of spur gear teeth 570 which meshingly engage second spur gear teeth 538, a plurality of radial apertures 572, a second member pocket 574 and a shoulder 576 having a central aperture 578 and a ring groove 580 sized to receive retaining ring 568. Second gear member 562 includes a disc-shaped geared portion 582 and a plurality of cylindrical pins 584. Geared portion 582 includes a plurality of radial splines 588 and an aperture 586 having a counter bore 592 of a first diameter and a through-hole 594 of a second, smaller diameter. Radial apertures 572 are each sized to receive a cylindrical pin 584 which are installed to geared portion 582 by press-fitting. Through-hole 594 is sized to receive shoulder 576. Counter bore 592 is sized to provide both radial and axial clearance for washer 564, spring means 566 and retaining ring 568. Second gear member 562 is installed to first gear member 560 by engaging cylindrical pins 584 into their respective radial apertures 572 and engaging shoulder 576 into through-hole 594. Spring means 566 is preferably a spring washer 596 which biases second gear member 562 upward into second member pocket 574. Cylindrical pins 584 are operable for guiding second gear member 562 in an axial direction relative to first gear member 560 and also for ensuring the transmission of drive torque between first and second gear members 560 and 562.

Second member 552 includes first and second shaft portions 600 and 602, respectively, gear member 604 and output pinion 524. First shaft portion 600 is sized to rotate within aperture 578 and bushing 462. Second shaft portion 602 is sized to rotate within aperture 544 and bushing 500. As such, second member 552 is supported for rotation within first and second housing portions 440 and 442. Gear member 604 is fixed for rotation with first shaft portion 600 and includes a plurality of radial splines 608 that are similar to those of second gear member 562. Second shaft portion 602 is coupled for rotation with gear member 604 and is supported for rotation within bushing 500. Output pinion 524 is coupled for rotation with second shaft portion 602 and includes a plurality of spur gear teeth 610 having a pitch diameter smaller than that of spur gear teeth 570. Gear teeth 610 extend through drive aperture 330 and meshingly engages gear teeth 378 such that latch sector 264 rotates when output pinion 524 rotates about its axis.

As spring means 566 normally biases second gear member 562 upward into first gear member 560, radial splines 588 and 608 are not normally engaged. Consequently, rotation of first member 550 does not normally cause rotation of second member 552 and vice-versa. Therefore, the size of third spring means 274 may be reduced since returning latch sector 264 to the returned position does not "back drive" gear train 414.

Operation of cinch motor 412 in either of the first and second rotational directions also causes the energization of electromagnet 540. When electromagnet 540 is energized, a magnetic field (not shown) is created which draws second gear member 562 toward gear member 604 so that radial splines 588 and 608 meshingly engage. Once radial splines 588 and 608 have engaged, drive torque input to first gear member 560 from second reducing gear 522b is transmitted to gear member 604 causing second shaft portion 602 to rotate. Rotation of second shaft portion 602 in a first direction causes output pinion 524 to drive latch sector 264 about first pin 276 in a first direction. Contact between contact tab 374 and latch sector contact surface 352 which occurs as latch sector 264 is driven about first pin 276 in the first direction causes latch sector 264 to drive latch ratchet 262 in a direction toward the fully latched position. It should be apparent from the above description that as latch ratchet 262 is brought into the fully latched position, contact between latch ratchet 262 and striker 394 draws sliding door 36 into the fully latched position. Rotation of second shaft portion 602 in a second direction causes output pinion 524 to drive latch sector 264 about first pin 276 in a second direction. Contact between ratchet contact 380 and ratchet contact surface 390 which occurs as latch sector 264 is driven about first pin 276 in the second direction causes latch sector 264 to drive dog member 268 in a direction which causes pawl member 266 to disengage latch ratchet 262.

Referring back to FIGS. 15 through 17, bracket member 254 may be fabricated as an individual component or may be combined with another component, such as the housing 260 of latch mechanism 250. Bracket member 254 includes a unlatch mechanism stop 620, first, second and third Bowden cable support apertures 622, 624 and 626, respectively, first and second spring apertures 628 and 630, respectively, first and second pin apertures 632 and 634, respectively, and first and second child guard lever apertures 636 and 638, respectively.

Unlatch mechanism 256 includes an interior unlatch lever 640, an exterior unlatch lever 642, a dog lever 644, first and second pins 646a and 646b, a first spring means 648, a latch lock mechanism 650 and second spring means (not shown). Exterior unlatch lever 642 includes a pin aperture (not shown), a slotted aperture 654, a stop means 656, a generally L-shaped slot 658 and cable retention means 660. With additional reference to FIGS. 28 and 29, cable retention means 660 is formed in a container-like shape having a plurality of sidewalls 662 and an end wall 664. A cable slot 666 extends though sidewalls 662a and 662b into a portion of end wall 664 and terminates in a seat aperture 668.

Interior unlatch lever 640 includes a pin aperture 670, a generally L-shaped slotted aperture 672, a contact surface 674, first and second Bowden cable retention means 676 and 678, respectively, and a spring aperture 680. First Bowden cable retention means 676 includes a base member 682 and a generally L-shaped leg member 684. Base member 682 is fixed to interior unlatch lever 640, thereby coupling first Bowden cable retention means 676 to interior unlatch lever 640. Leg member 684 includes a base portion 686 and a leg portion 688. Leg portion 688 spaces base portion 686 apart from base member 682 a predetermined first distance. A cable slot 690 extends through leg member 684 and into a portion of base member 682 where it terminates in a seat aperture 692.

Second Bowden cable retention means 678 also includes a base member 694 and a leg member 696. Base member 694 is fixed to interior unlatch lever 640, thereby coupling second Bowden cable retention means 678 to interior unlatch lever 640. Leg member 696 is spaced apart from interior unlatch lever 640 at a predetermined second distance. A cable slot (not shown) extends through base member 694 where it terminates in a seat aperture (not shown).

Dog lever 644 includes a pin aperture (not shown), a slotted aperture 700 and a dog actuation lever 702. First pin 646a is inserted through the pin apertures in dog lever 644, interior and exterior unlatch levers 640 and 642, and press-fit into aperture 632, thereby coupling interior and exterior unlatch levers 640 and 642 and dog lever 644 to bracket member 254 as well as supporting these levers for rotation about first pin 646a. Dog lever 644 and actuation arm 382 are coupled together such that dog actuation lever 702 extends into lever aperture 392. As such, dog lever 644 and actuation arm 382 are operable for actuating one another.

Latch lock mechanism 650 includes a link connecting arm 704, a pin aperture 706, a spring aperture (not shown), an unlatch lever arm 708 having an actuation slot 707, and an unlatch lever pin 710. Second pin 646b is inserted through pin aperture 706 and press-fit into pin aperture 634, thereby coupling latch lock mechanism 650 to bracket member 254 was well as supporting the mechanism for rotation about second pin 646b. Unlatch lever pin 710 is coupled to unlatch lever arm 708 and extends through L-shaped slot 658. Rotation of latch lock mechanism 650 about second pin 646b is operable for placing unlatch lever pin 710 in an engaged mode or a disengaged mode. Unlatch lever pin 710 is positioned in the engaged mode when it lies within the narrow slotted tip portion 712 of L-shaped slot 658. Unlatch lever pin 710 is positioned in the disengaged mode when it does not lie within the narrow slotted tip portion 712 of L-shaped slot 658.

A lock switch 714 is coupled to control module 54 and produces a digital signal indicative of the status of latch lock mechanism 650. When latch lock mechanism 650 is placed in the engaged position, lock switch 714 produces a high signal (i.e., open to ground) which causes control module 54 to inhibit the operation of sliding door 36 in an automatic mode unless the position of latch lock mechanism 650 is first changed to the disengaged position.

First Bowden cable 150 couples exterior handle 148 to exterior unlatch lever 642. First Bowden cable 150 includes a hollow cable sheath 716, a resilient retaining grommet 718 coupled to cable sheath 716, a braided wire cable 720 disposed within cable sheath 716 and a first Bowden cable retainer 722. As shown in FIG. 28, first Bowden cable retainer 722 is an aluminum sphere 724 which is staked or otherwise secured to the end of braided wire cable 720. The diameter of sphere 724 is sized to fit between sidewalls 662 with a predetermined amount of clearance. The predetermined amount of clearance prevents first Bowden cable retainer 722 from binding one or more sidewalls 662 as exterior unlatch lever 642 is operated. However, the amount of predetermined clearance is sufficiently small to ensure that if an assembly or service technician attempted to place a Bowden cable retainer from another cable into first Bowden cable retainer 722, the Bowden cable retainer would either be too large to fit within sidewalls 662 or would fit too loosely within sidewalls 662 so as to make such assembly errors readily apparent to the technician. Similarly, the predetermined first distance between base member 682 and leg member 684 is selected so as to render the misassembly of first Bowden cable retainer 722 into first Bowden cable retainer 676 apparent to the technician. First Bowden cable 150 is threaded into cable slot 666 and sphere 724 is positioned between sidewalls 662. Retaining grommet 718 is inserted into first support aperture 622 to secure first Bowden cable 150 to bracket member 254. Retaining grommet 718 is sized to fit first support aperture 622 and is either too large or small to fit second and third support apertures 624 and 626 properly. As such, the misassembly of first Bowden cable 150 to second or third support apertures 624 or 626 will be immediately apparent to assembly and service technicians.

A second Bowden cable 154 couples interior handle 152 to interior unlatch lever 640. Second Bowden cable 154 similarly includes a hollow cable sheath 726, a resilient retaining grommet 728 coupled to cable sheath 726, a braided wire cable 730 disposed within cable sheath 726 and a second Bowden cable retainer 732. Second Bowden cable retainer 732 is an aluminum sphere 734 which is staked or otherwise secured to the end of braided wire cable 730. The diameter of sphere 734 is sized to match the distance between base portion 686 and base member 682 with a predetermined amount of clearance similar to that discussed above for first Bowden cable retainer 722. The diameter of sphere 734, however, is sufficiently different from that of sphere 722 so as to prevent its insertion into cable retention means 660. Second Bowden cable 154 is threaded into cable slot 690 and sphere 734 is positioned between base portion 686 and base member 682. Retaining grommet 728 is sized to fit second support aperture 624 and is either too large or small to fit first and third support apertures 622 and 626 properly. As such, the misassembly of second Bowden cable 154 to first or third support apertures 622 or 626 will be immediately apparent to assembly and service technicians.

A third Bowden cable 736 couples hold-open latch 128 to interior unlatch lever 640. Third Bowden cable 736 again similarly includes a hollow cable sheath 738, a resilient retaining grommet 740 coupled to cable sheath 738, a braided wire cable 742 disposed within cable sheath 738 and a third Bowden cable retainer 740. Third Bowden cable retainer 740 is fabricated from aluminum and includes a sphere portion 740a and a plate portion 740b which is fixedly secured to sphere portion 740a. Third Bowden cable retainer 740 is staked or otherwise secured to the end of braided wire cable 742. The unique configuration of third Bowden cable retainer 740 prevents or renders apparent the misassembly of the Bowden cable retainer 740 to either cable retention means 660 or first Bowden cable retention means 676. Third Bowden cable 736 is secured to second Bowden cable retention means 678 in a manner similar to that described above for second Bowden cable 154. Retaining grommet 740 is inserted into third support aperture 626 to secure third Bowden cable 736 to bracket member 254. Retaining grommet 740 is sized to fit third support aperture 626 and is either too large or small to fit first and second support apertures 622 and 624 properly. As such, the misassembly of third Bowden cable 736 to first or second support apertures 622 or 624 will be immediately apparent to assembly and service technicians.

Referring briefly to FIG. 30, a cable retention means and a Bowden cable retainer according to an alternate embodiment are shown. As shown, Bowden cable retainer 750 is generally cylindrical in shape, formed from a material such as aluminum and coupled to an end of braided wire cable 752 in a conventional manner. Cable retention means 754 is generally shaped in the form of a hollow cylinder and includes an T-shaped cable slot 756 with a first portion 758 extending parallel to the axis of cable retention means 754 and a second portion 760 which extends around a portion of the perimeter of cable retention means 754. Bowden cable retainer 750 is sized in a manner which includes a predetermined amount of clearance as described above. Wire cable 752 is threaded into cable slot 756 and Bowden cable retainer 750 is inserted into the hollow interior of cable retention means 754. When wire cable 752 reaches second portion 760, Bowden cable retainer 750 is rotated within cable retention means 754 to guard against the withdrawal of Bowden cable retainer 750.

In one application, the aluminum sphere 724 of first Bowden cable retainer 722 has a diameter of approximately 6 mm, the aluminum sphere 734 of second Bowden cable retainer 732 has a diameter of approximately 8 mm and the distance between sidewalls 662 is approximately 6.5 mm. Accordingly, as second Bowden cable retainer 732 will not fit into cable retention means 660, any assembly errors would be rendered immediately apparent. In further illustration of the error-proofing method of the present invention, the diameter of first support aperture 622 is approximately 12 mm and the diameter, the diameter of first retaining grommet 718 is approximately 11.5 mm, the diameter of second support aperture 624 is approximately 8.5 mm and the diameter of second retaining grommet 728 is approximately 8 mm. Accordingly, as the diameter of first retaining grommet 718 is substantially larger than second support aperture 624 to prevent its insertion therein, any assembly errors would be rendered immediately apparent.

From the foregoing discussion, it should be readily apparent to those skilled in the art that the error-proofing of an assembly having multiple wire cables can be accomplished by utilizing a series of cables having Bowden cable retainers of the same shape which are sized differently and/or by utilizing cables with Bowden cable retainers of different shapes.

Figure 17B:
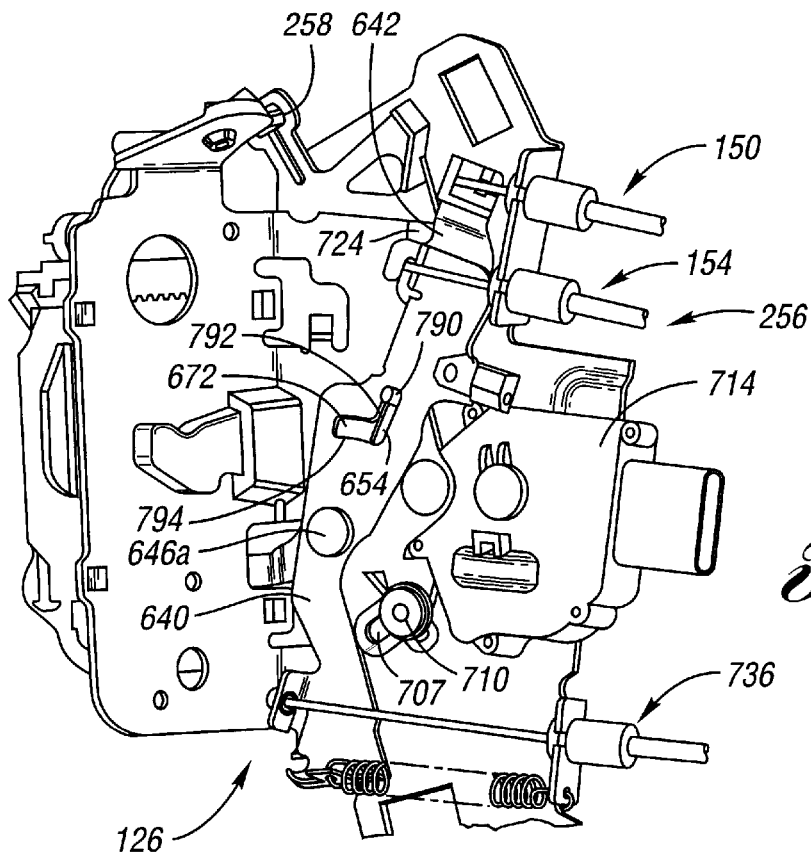
FIG. 17B is a perspective view similar to that of FIG. 17A, showing the actuation of the unlatching mechanism when the child guard mechanism is disengaged.
Figure 18:
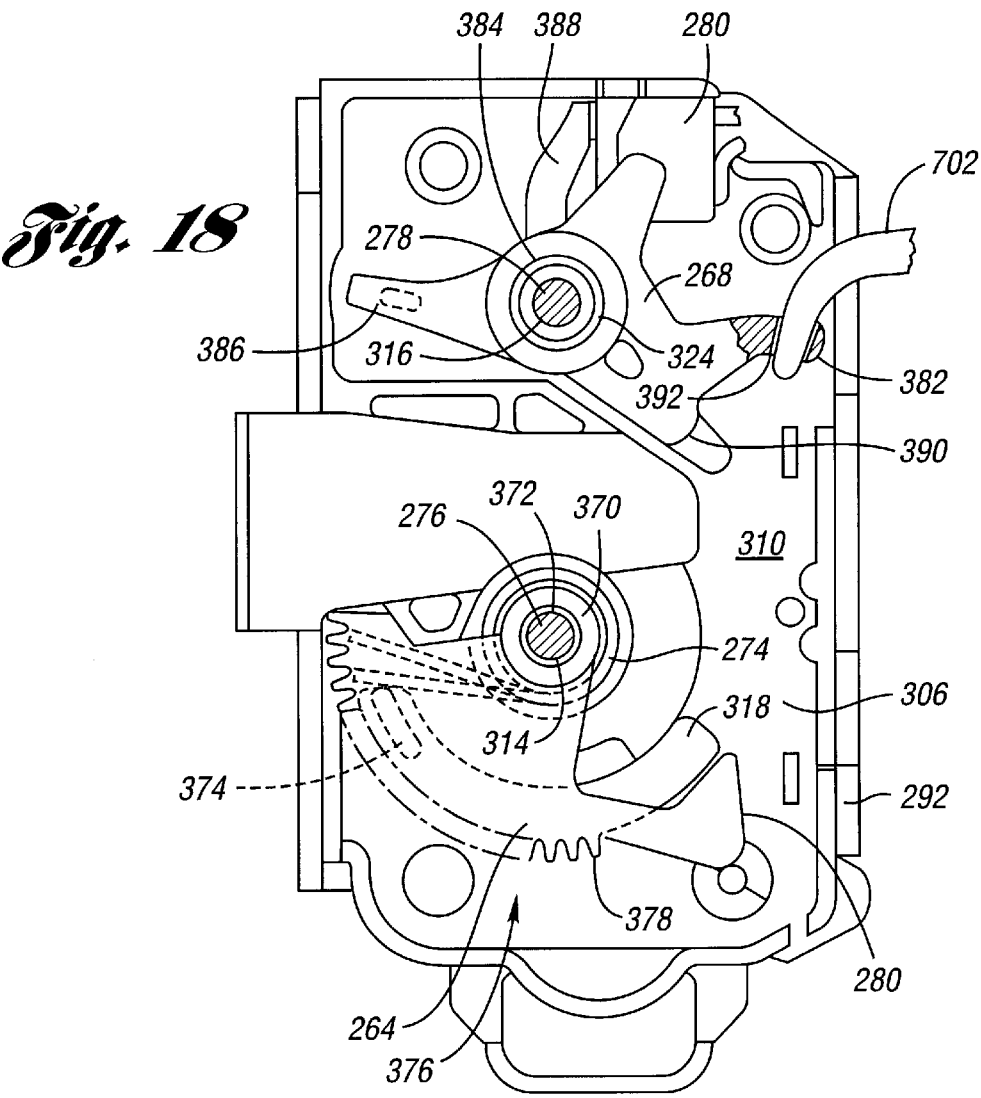
FIG. 18 is a top view of the latch mechanism of the present invention with the cover removed.
Figure 19:
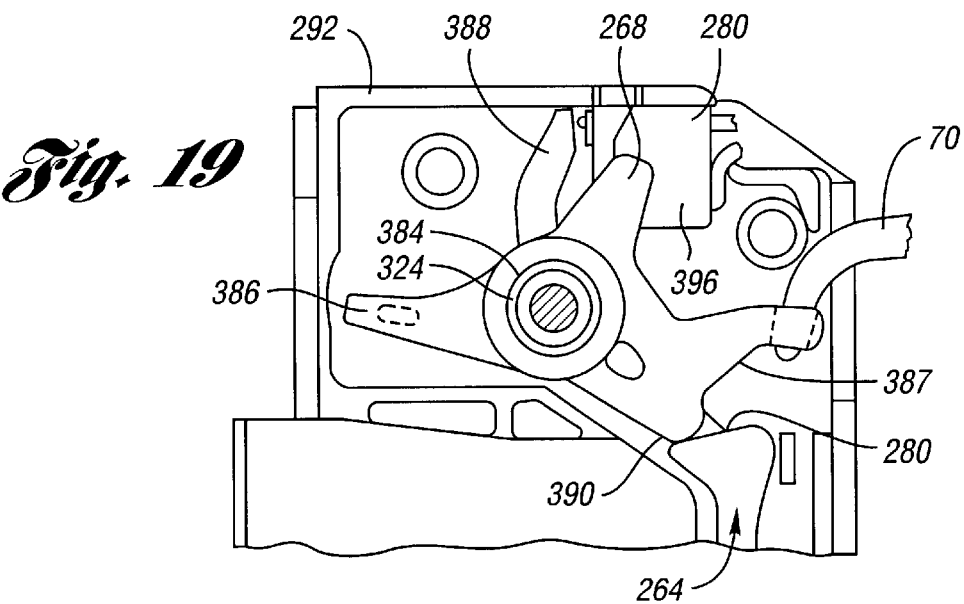
FIG. 19 is a portion of the latch mechanism illustrated in FIG. 18 showing the relationship between the sensor arm and the pawl switch when the latch ratchet rotates the dog member to release the pawl.

With additional reference to FIG. 17B, actuation of exterior handle 148 creates a force that is transmitted through first Bowden cable 150 and acts against end wall 664 to cause exterior unlatch lever 642 to rotate about first pin 646a. If unlatch lever pin 710 is in the engaged mode, unlatch lever pin will contact unlatch lever arm 708, as well as exterior unlatch lever 642 along the narrow portion 712 of L-shaped slot 658, causing unlatch lever pin 710 to rotate about second pin 646b in actuation slot 707. As unlatch lever pin 710 extends through exterior unlatch lever 642, rotation of exterior unlatch lever 642 about first pin 646a causes unlatch lever pin 710 rotate outward from second pin 646b and rotate dog lever 644 about first pin 646a. If dog lever 644 is sufficiently rotated about first pin 646a, actuation lever 702 contacts actuation arm 382 which in turn causes dog member 268 to rotate pawl 266 away from latch ratchet 262 to permit first spring means 270 to rotate latch ratchet 262 to the fully open position. If, however, unlatch lever pin 710 is in the disengaged mode, rotation of exterior unlatch lever 642 will not cause unlatch lever pin 710 to contact dog lever 644, and as such, actuation lever will not contact actuation arm 382 to cause dog member 268 to rotate pawl 266 and release latch ratchet 262.

Figure 17C:
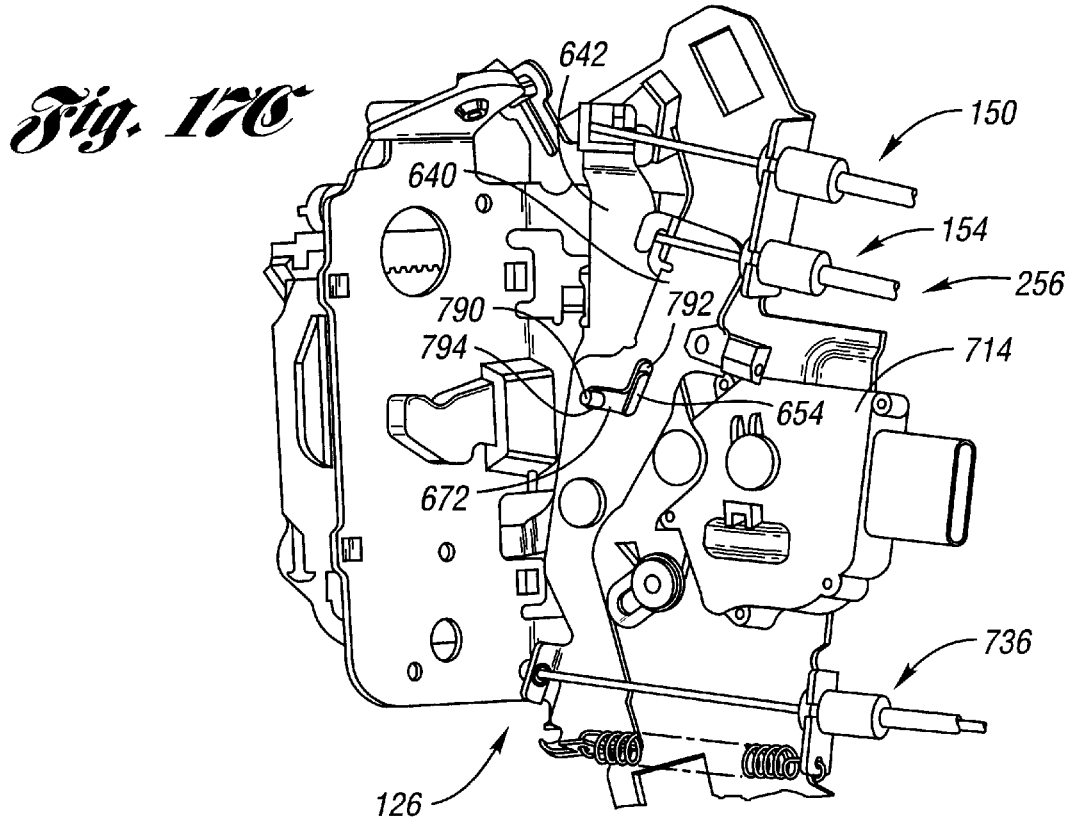
FIG. 17C is another perspective view similar to that of FIG. 17A, showing the actuation of the unlatching mechanism through the interior unlatch lever when the child guard mechanism is engaged.

With reference to FIG. 17C, actuation of interior handle 152 (i.e., release button 152a) creates a force that is transmitted through second Bowden cable 154 and acts against base member 682 to cause interior unlatch lever 640 to rotate about first pin 646a. Actuation of interior handle 152 also creates a force which is transmitted through third Bowden cable 736, which in turn causes hold-open latch 128 to pivot about its connection to door assembly 138 and release first guide track 38. Child guard mechanism 258 selectively couples interior unlatch lever 640 to exterior unlatch lever 642.

Child guard mechanism 258 includes a first link 780 which is pivotably coupled to bracket member 254 at first child guard lever aperture 636, a second link 782 which is pivotably coupled to bracket member at second child guard lever aperture 638, and a third link 784. First link 780 includes a selector arm 786 and an actuation arm 788. Selector arm 786 is operable between an engaged position which permits latch ratchet 262 to be unlatched only by manual operation of exterior handle 148 and a disengaged position which permits latch ratchet 262 to be unlatched by automatic operation or by manual operation of the exterior or interior handles 148 and 152. Second link 782 is coupled to first link 780 such that movement of first link 780 between the engaged and disengaged positions causes second link 782 to rotate about second child guard lever aperture 638. Third link 784 is pivotably coupled to second link 782 and includes an actuation pin 790. Actuation pin 790 extends through slotted aperture 654 and L-shaped slot 672.

Positioning of child guard mechanism 258 into the disengaged position places actuation pin 790 in a portion of L-shaped slot 672 proximate its tip 792. Therefore, when child guard mechanism 258 is disengaged and interior unlatch lever 640 is rotated about first pin 646a, actuation pin 790 is brought into contact with the side of L-shaped slot 672, causing exterior unlatch lever 642 to rotate about first pin 646a with interior unlatch lever 640. Consequently, the actuation of interior handle 152 when child guard mechanism 258 is disengaged permits interior unlatch lever 640 to rotate exterior unlatch lever 642 and unlatch power latching mechanism 126 as described above.

Positioning of child guard mechanism 258 into the engaged position places actuation pin 790 in a portion of L-shaped slot 672 proximate its base 794. Therefore, when child guard mechanism 258 is engaged and interior unlatch lever 640 is rotated about first pin 646a, actuation pin 790 does not contact the side of slotted aperture 672 and the position of exterior unlatch lever 642 is not affected. Consequently, the actuation of interior handle 152 when child guard mechanism 258 is engaged does not permits interior unlatch lever 640 to rotate exterior unlatch lever 642 and unlatch power latching mechanism 126.

Child guard mechanism 258 permits exterior handle 148 to actuate hold-open latch 128 to release first guide track 38. Specifically, the rotating motion of exterior unlatch lever 642 in a direction tending to unlatch power latching mechanism 126 is transmitted to interior unlatch lever 640 to cause it to similarly rotate about first pin 646a.

From the foregoing discussion of latch mechanism 250 and power drive assembly 252, above, it should be readily apparent to those skilled in the art that power latching mechanism 126 may be configured in a manner to permit its integration into other vehicle closure systems, including tailgates and other passenger doors which are pivotably coupled to a vehicle body, as wells as trunk lids and hoods. With reference to FIGS. 1, 3A and 3B, a power latching mechanism according to an alternate embodiment which is tailored for use in tailgate 64 is generally indicated by reference numeral 126'. Power latching mechanism 126' does not include a bracket member or a child guard mechanism. Power latching mechanism 126' is otherwise generally similar to power latching mechanism 126 except that unlatch mechanism 256' is highly simplified and consists of a single lever 800 pivotably coupled to housing 260'. Wire harness 67d extends into a hole 801 in tailgate panel 65 which is sealed by sealing grommet 67e. Wire harness 67d is coupled to body control module 52.

Power latching mechanism 126' is fixedly coupled to tailgate panel 65. Lever 800 is mechanically coupled through a link member 802 to key switch 66. Rotation of key switch 66 in a first direction causes link member 802 to rotate lever 800 which in turn causes dog member 268 to rotate about second pin 278 and release pawl 266 to unlatch power latching mechanism 126'. Power latching mechanism 126' is electrically coupled to body control module 52. Body control module 52 is operable for monitoring the state of the pawl and ratchet switches 280 and 284 and determining the latched state of power latching mechanism 126'. Body control module 52 is also operable for monitoring-the output signals generated by tailgate handle switch 67c, an interior switch 134 or a remote keyless-entry control device 962. Upon receiving an output signal from tailgate handle switch 67c, interior switch 134 or remote keyless-entry control device 962 indicative of a command to cause power latching mechanism 126' to unlatch, body control module 52 is first determines whether latch ratchet 262 is in the fully unlatched position. If latch ratchet 262 is not in the fully unlatched position, body control module 52 is operable controlling cinch motor 412 to operate and drive latch sector 264 in the second direction to cause ratchet contact 280 to contact ratchet contact surface 390 and rotate pawl 266 to release latch ratchet 262 as described above.

Consequently, tailgate may be operated without conventional interior and exterior handles which mechanically operate the latching mechanism. This construction is advantageous in that it permits any holes in the exterior surface 804 of tailgate panel 65 to be sealed against entry by dirt and water under conditions in which vehicle 12 would normally be operated. This construction is also advantageous due to the ability to reduce the number of parts comprising the tailgate, as well as the ability to eliminate issues relating to the design and adjustment of conventional mechanical linkages associated with conventional interior and exterior handles for mechanically actuating the latch mechanism.

From the foregoing, it should be readily apparent to those skilled in the art that other power latch mechanism may be employed to eliminate conventional handles for mechanically operating the latch. Consequently, the scope of this aspect of the present invention is not limited to a power latching mechanism having cinching capabilities, but extends to any latching mechanism which may be electrically or electromechanically operated in an unlatching manner. It should also be readily apparent to those skilled in the art that this aspect of the present invention has applicability to other types of door handles and doors and as such, it not limited to lightbar assemblies or tailgates.

It should also be readily apparent to those skilled in the art that the power latch mechanism of the present invention may be coupled to the opposite side of the sliding door to engage a striker coupled to the second body pillar (i.e., second body pillar 26). This configuration is especially advantageous in that the hold-open latch may be designed in a manner to engage the striker when the sliding door is in the fully open position.

Figure 32:
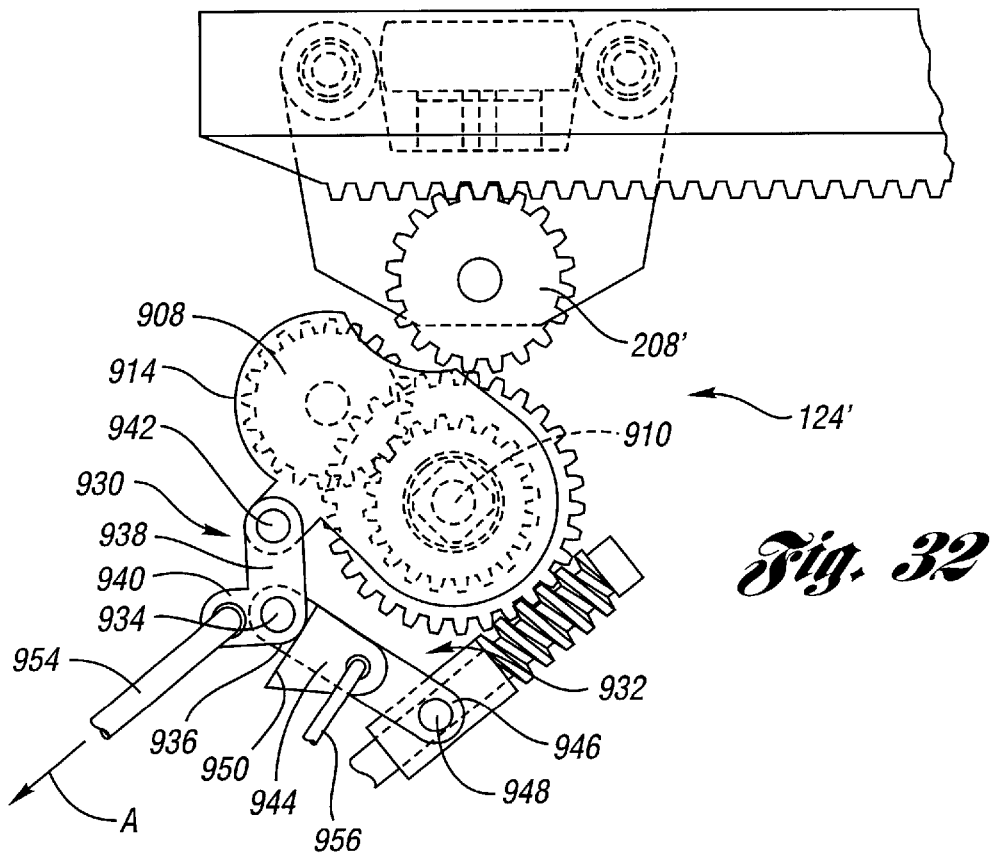
FIG. 32 is a portion of the power door drive mechanism shown in FIG. 31 with the drive clutch disengaged.
Figure 33:
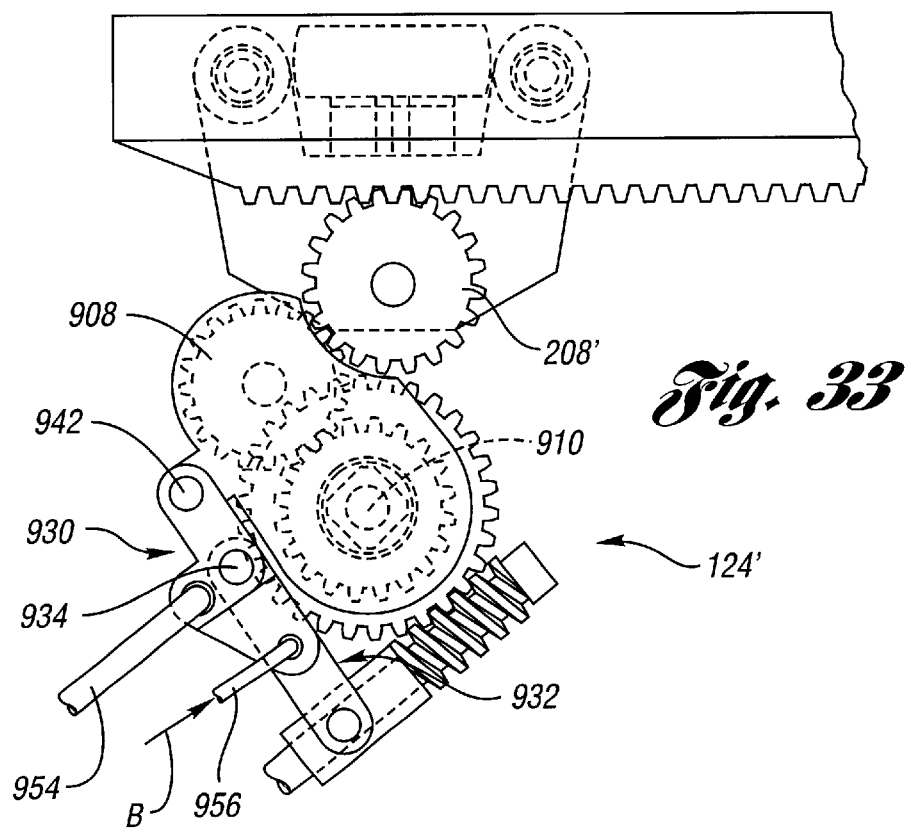
FIG. 33 is a portion of the power door drive mechanism shown in FIG. 31 with the drive clutch engaged.

A power door drive mechanism according to an alternate embodiment of the present invention is generally indicated by reference numeral 124' in FIGS. 31 through 33. Power door drive mechanism 124' includes power unit 200, a drive unit 204', a drive clutch 206', and a drive pinion 208'. Power unit 200 includes drive motor 210, gearbox 212 and driveshaft 202.

Drive pinion axle 900 extends through an aperture 902 in drive pinion 208' and couples drive pinion 208' to lower hinge member 168'. Drive pinion axle 900 also supports drive pinion 208' for rotation about the longitudinal axis of drive pinion axle 900. Drive pinion 208' includes a plurality of drive pinion teeth 230' which meshingly engage rack teeth 92.

Drive unit 204' includes a worm gear 904, a reducing gear 906, an idler gear 908, first and second axles 910 and 912 and a mounting assembly 914. Mounting assembly 914 supports worm gear 904 for rotation about its longitudinal axis. Driveshaft 202 is coupled to worm gear 904 and drives it about its longitudinal axis. Reducing gear 906 includes an axle aperture 916, a set of first gear teeth 918 which meshingly engage the teeth 920 worm gear 904, and a set of second gear teeth 922. First axle 910 is disposed through lower hinge member 168', mounting assembly 914 and axle aperture 916 and thereby supports reducing gear 906 for rotation about the axis of first axle 910. First axle 910 also supports drive unit 204' for rotation about the axis of first axle 910. Idler gear 908 includes an axle aperture 924 and a set of gear teeth 926 which meshingly engage second gear teeth 922 and the teeth 230' of drive pinion 208'. Second axle 912 is disposed through mounting assembly 914 and axle aperture 924 and thereby supports idler gear 908 for rotation about the axis of second axle 912.

Drive clutch 206' includes first and second hinge members 930 and 932, respectively, which are pivotably connected by a pivot pin 934. First hinge member 930 is generally L-shaped and includes a cam 936 at the intersection of base portion 938 and leg portion 940. A pivot pin 942 couples first hinge member 930 to the portion of mounting assembly 914 proximate idler gear 908. Second hinge member 932 includes a cam follower 944, a link portion 946, and a pivot pin 948. Cam follower 944 is coupled to link portion 946 includes a cam follower edge 950 which abuts leg portion 940 when drive clutch 206' is not actuated. Link portion 946 is pivotably coupled to first hinge member 930 by pivot pin 934. First and second hinge members 930 and 932 are coupled to unlatch mechanism 256' by first and second links 954 and 956, respectively. First and second links 954 and 956 are preferably Bowden cables having a braided wire cable material.

When one or both of the exterior and interior handles 148 and 152 are placed in their extended positions, first link 780 creates a force as shown by direction arrow A in FIG. 33 which causes first hinge member 930 to rotate about pin 934. In response thereto, cam 936 is caused to act against cam follower 944 and rotate mounting assembly 914 about first axle 910 into a disengaged position wherein idler gear 908 is disengaged from drive pinion 208' to permit sliding door 36' to be operated manually. Depending upon the configuration of cam 936 and cam follower 944, drive clutch 206' may be locked into the disengaged position by the actuation of either one of the exterior or interior handles 148 and 152.

Second link member 932 is coupled to a linear actuator 960 which, when actuated upon the occurrence of one or more predetermined conditions, creates a force as shown by direction arrow B in FIG. 33 which causes second link member 932 to rotate about pin 910 such that cam follower edge 950 abuts leg portion 940 and idler gear 908 engages drive pinion 208'.

Referring back to FIGS. 4 and 10, control module 54 is operable for selectively controlling the operation of sliding door 36. Control module 54 is coupled to body control module 52 as well as various other electronic control devices throughout vehicle 12, such as automatic transmission controller 50 and engine controller 48. As a result, control module 54 receives data on numerous vehicle dynamics, including vehicle speed, ignition status, presently engaged gear ratio and requests to open sliding door 36 generated from one of the interior switches 134 or a remote keyless-entry control device 962. Control module 54 is also coupled to drive motor 210, drive clutch 206, hall effect sensor 214, pawl switch 280, ratchet switch 282, hold open switch 964, lock switch 714, cinch clutch 416, cinch motor 412, handle switch 146, and a child guard switch 966.

Control module 54 controls both the actuation of drive motor 210 and the direction with which it rotates. Operation of drive motor 210 in a first direction causes drive pinion 208 to be rotated in a direction which tends to push door panel assembly 138 into the open position. Conversely, operation of drive motor 210 in a second direction causes drive pinion 208 to be rotated in a direction which tends to push door panel assembly 138 into the closed position.

Control module 54 receives signals from various sensors located throughout vehicle 12, determines the operational state of vehicle 12, determines the appropriate actions that should be made with respect to sliding door 36 and initiates any necessary command signals to initiate such actions. Accordingly, upon receipt of a command to cycle sliding door 36 from one of the interior switches 134 or remote keyless-entry control device 962, control module 54 determines the state of the sliding door (e.g. fully closed) and causes power door drive mechanism 124 and power latching mechanism 126 to operate according to a predetermined control strategy.

Figure 34:
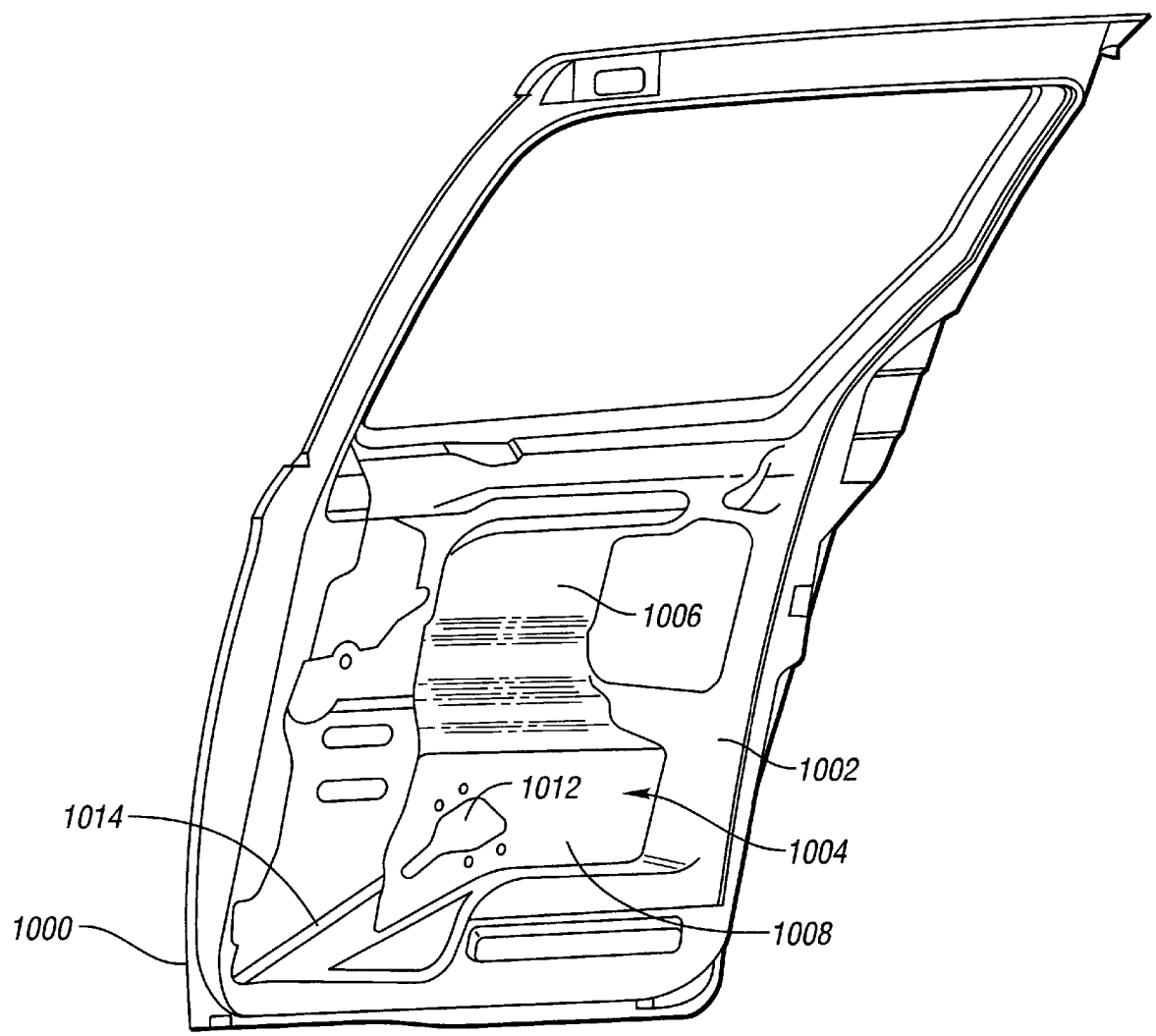
FIG. 34 is a perspective view of the door panel of the present invention.

With reference to FIGS. 10 and 34, door assembly 136 includes trim panel assembly 140 and a stamped metal or molded plastic door panel assembly 138 that includes an exterior panel 1000 and an interior panel 1002. Interior panel 1002 is fixedly coupled to exterior panel 1000 and includes a recessed cavity 1004 having a first portion 1006 adapted for housing control module 54 and a second portion 1008 adapted for housing a portion of power door drive mechanism 124. In the particular embodiment illustrated, second portion 1008 includes a power unit cut-out 1012, adapted to house drive motor 210 and gearbox 212, and a driveshaft pocket 1014, adapted to house a portion of flexible driveshaft 202. Trim panel assembly 140 covers recessed cavity 1004 to conceal drive motor 210, gearbox 212 and control module 54 from the view of the passengers, as well as to dampen any noise and vibration produced during the operation of sliding door 36. Accordingly, trim panel assembly 140 may include an insulating material disposed between control module 54, drive motor 210 and/or gearbox 212 and the interior of vehicle 12.

The configuration shown is particularly advantageous due to its ability to be used across a wide range of vehicle trim levels. For example, should a completely manual sliding door be desired, the vehicle manufacturer need only omit power door drive mechanism 124 and control module 54, substitute a completely mechanical version of the latching mechanism for power latching mechanism 126 and substitute a less complex wiring harness for wiring harness 190. Preferably, the completely mechanical version of the latching mechanism is identical to power latching mechanism 126 except that any components or assemblies associated with the power latching and unlatching (e.g., power drive assembly 252, latch sector 264) have been omitted or substituted with other components, such as spacers, to provide substantial similarity between the latch mechanisms in their installation and operation.

Similarly, should a manual sliding door with power locks be desired, the vehicle manufacturer need only omit power door drive mechanism 124 and control module 54, substitute an electronically-actuated latching mechanism for power latching mechanism 126 and substitute a less complex wiring harness for wiring harness 190. While the electronically-actuated latching mechanism may be the same component as the power latching mechanism 126, it preferably substitutes a less-complex mechanism than power drive assembly 252 for actuating dog member 268 to permit latch ratchet 262 to return to the fully unlatched position. Configuration in this manner permits the cost of the latching mechanism to be minimized while maintaining substantial similarity between the latch mechanisms in their installation and operation.

It will be understood, however, that the cavity for drive motor 210, gearbox 212 and/or control module 54 could alternatively be formed between exterior panel 1000 and interior panel 1002 (i.e., the cavity may be formed in door panel assembly 138). Accordingly, the particular embodiment illustrated is not intended to be limiting in any manner.

Figure 35A:
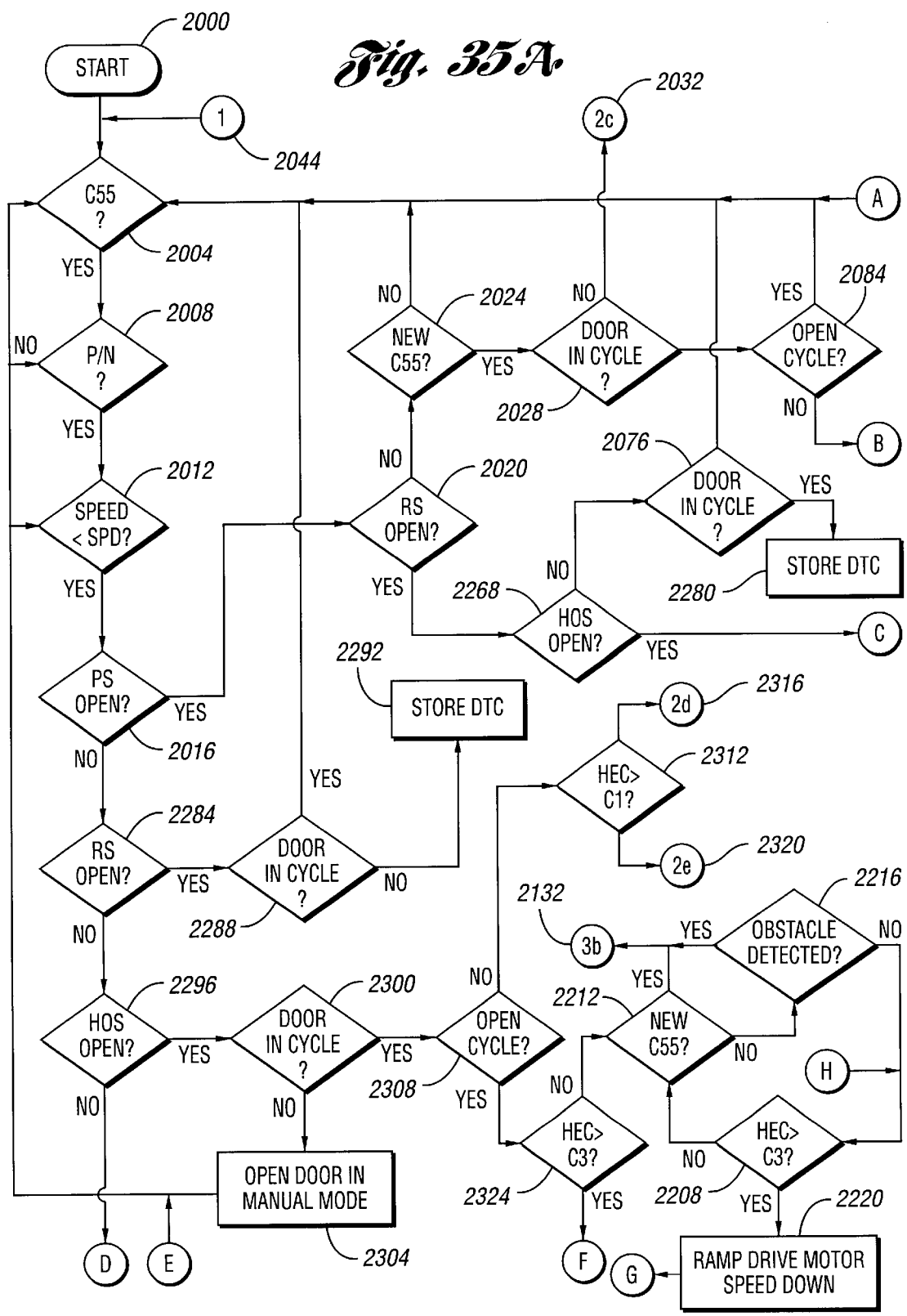
FIG. 35 is a schematic diagram in flowchart form of a first portion of the method of the present invention for controlling a power vehicle door.
Figure 35B:
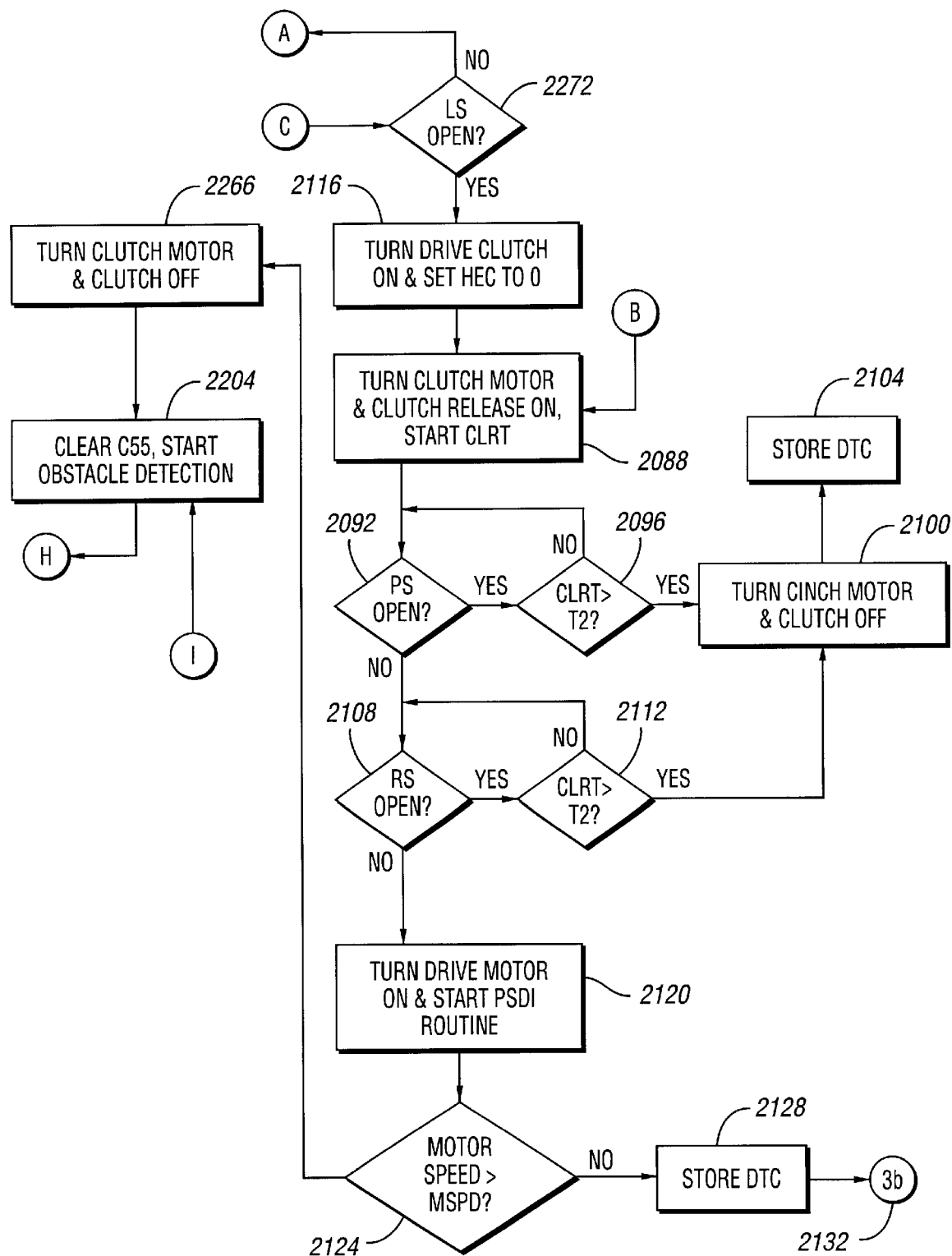
Figure 35C:
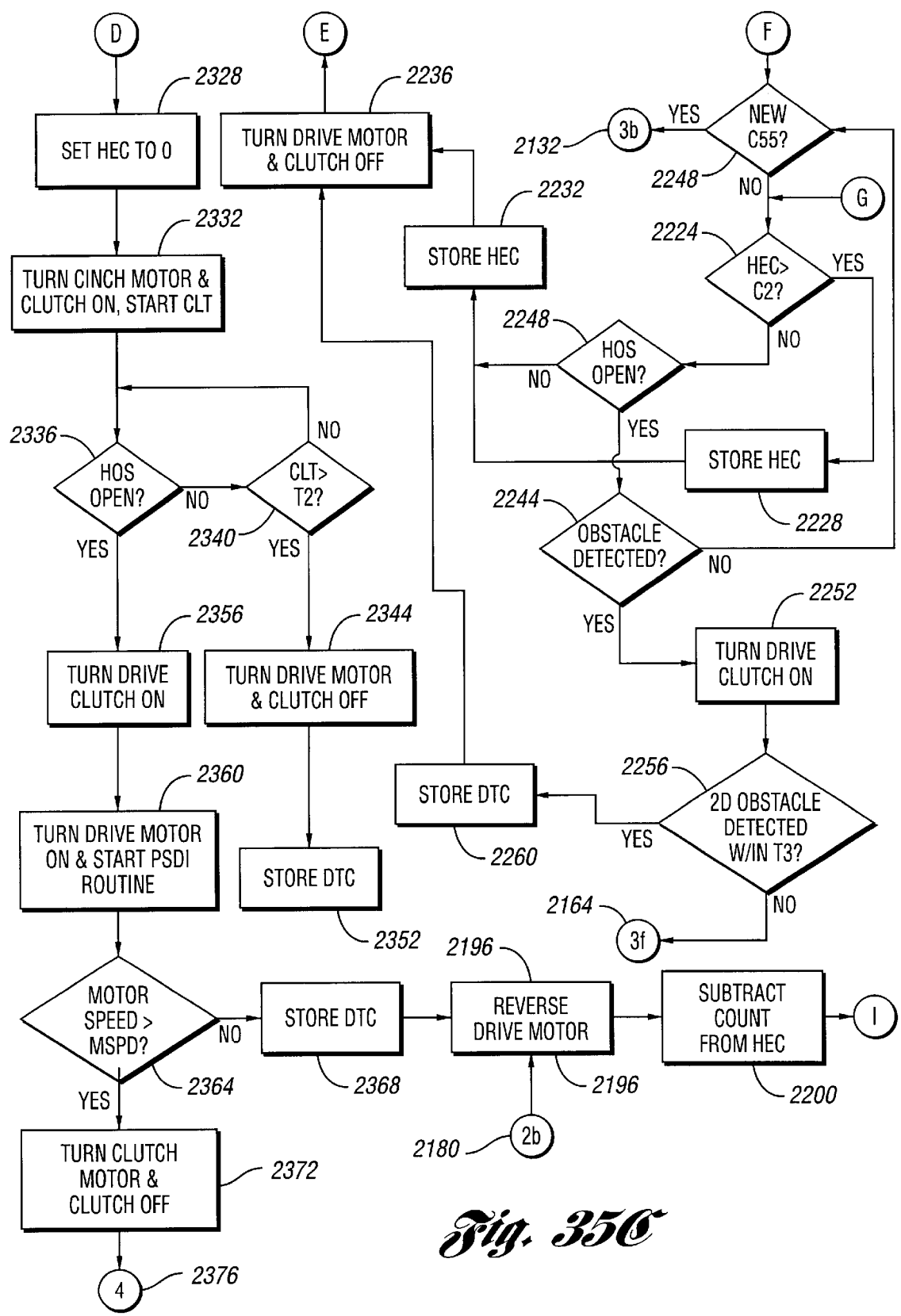

Referring to FIG. 35, the methodology for controlling sliding door 36 is shown in schematic flow-diagram form. The methodology is entered at bubble 2000 and progresses to decision block 2004 where control module 54 determines whether body control module 52 has issued a command signal (C55 command) to open or close the sliding door 36. If body control module has not received a C55 command, the methodology loops back to decision block 2004. If body control module 52 has received a C55 command, the methodology proceeds to decision block 2008.

In decision block 2008, control module 54 evaluates data received from automatic transmission controller 50 to determine if vehicle is in a gear ratio corresponding to park or neutral. If vehicle is not in a gear ratio corresponding to park or neutral, the methodology returns to decision block 2004. If vehicle is in a gear ratio corresponding to park or neutral, the methodology proceeds to decision block 2012 where control module 54 evaluates data received from engine controller 48 to determine if the speed of vehicle 12 is above a predetermined maximum speed.

If the speed of vehicle 12 is above the predetermined maximum speed in decision block 2012, the methodology loops back to decision block 2004. If the speed of vehicle 12 is not above the predetermined maximum speed, the methodology proceeds to decision block 2016 where the status of paw switch 280 is evaluated. If pawl switch 280 is in an open (i.e., open circuit to ground), latch ratchet 262 has been placed in one of the fully latched and partially latched positions. The methodology proceeds to decision block 2020 where the methodology determines if ratchet switch is open. If ratchet switch 282 is not open, the methodology proceeds to decision block 2024 where the methodology determines if a new C55 command has been generated by body control module 52. If a new C55 command has not been generated, the methodology loops back to decision block 2004. If a new C55 command has been generated, the methodology proceeds to decision block 2028 where the methodology determines if sliding door 36 is being operated in an opening or a closing cycle.

Figure 36A:
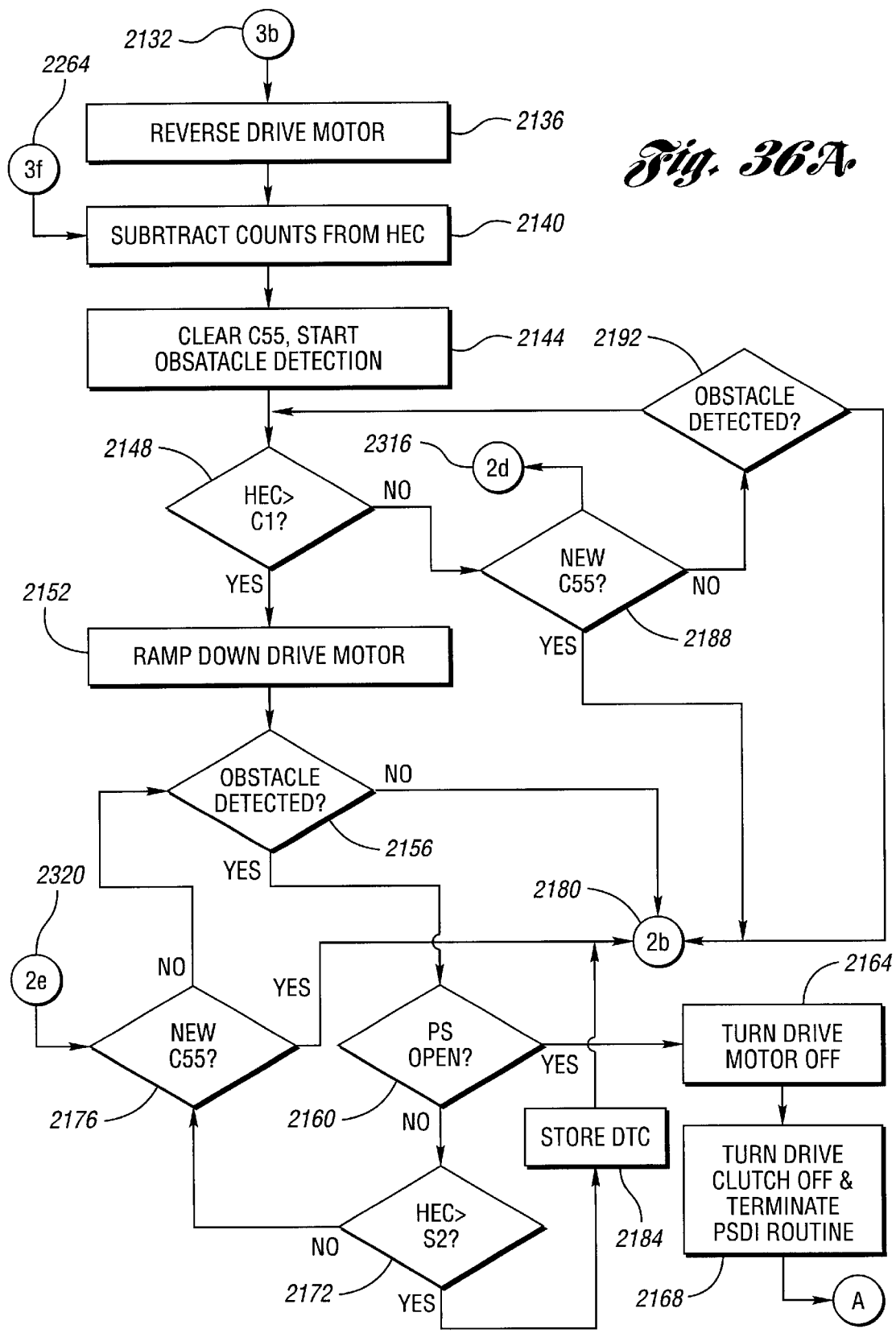
FIG. 36 is a schematic diagram in flowchart form of a second portion of the method of the present invention for controlling a power vehicle door.
Figure 36B:
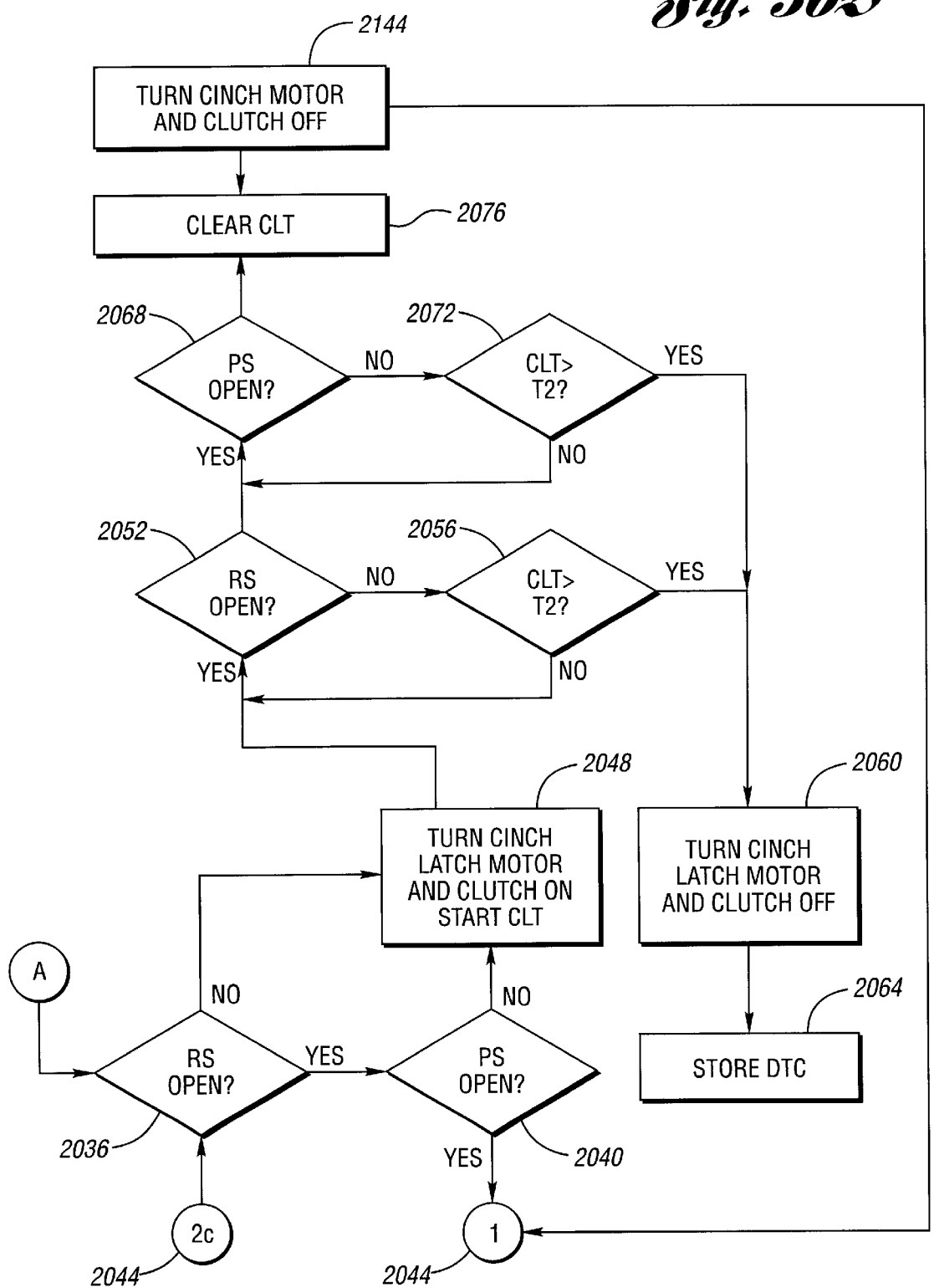

If sliding door is not being operated in an opening or closing cycle, the methodology proceeds to bubble 2032 where the methodology proceeds along branch 2c. Referring now to FIG. 36, the methodology then proceeds from bubble 2032 to decision block 2036 where the status of ratchet switch 282 is evaluated. If ratchet switch 282 is open, the methodology proceeds to decision block 2040 where the status of pawl switch 280 is evaluated. If pawl switch 280 is open sliding door 36 is fully closed, and the methodology proceeds to bubble 2044 which, referring briefly to FIG. 35, causes the methodology to loop back to decision block 2004. Returning to decision block 2040 in FIG. 36, if pawl switch 280 is not open, the methodology proceeds to block 2048 where cinch motor 412 is turned on in a closing direction, cinch clutch 416 is turned on and the cinch latch timer (CLT) is started. Referring back to decision block 2036, if ratchet switch 282 is not open, the methodology proceeds to block 2048.

The methodology proceeds to decision block 2052 where the status of ratchet switch 282 is evaluated. If ratchet switch 282 is not open, the methodology proceeds to decision block 2056. In decision block 2056, the methodology determines if the value of the CLT has exceeded a predetermined maximum time (T2). In the particular example shown, T2 is four seconds. If the value in the CLT has not exceeded T2, the methodology loops back to decision block 2052. If the value of the CLT has exceeded T2, the methodology proceeds to block 2060 where cinch motor 412 and cinch clutch 416 are turned off. The methodology proceeds to block 2064 where a diagnostic troubleshooting code (DTC) is stored in the memory of control module 54. The particular DTC stored aids technicians in evaluating failures in the power sliding door system 10 and also causes control module 54 to disable the automatic operation of sliding door 36.

Referring back to decision block 2052, if ratchet switch 282 is open, the methodology proceeds to decision block 2068 where the status of pawl switch 280 is evaluated. If pawl switch 280 is not open, the methodology proceeds to decision block 2072 where the methodology determines if the value in the CLT has exceeded T2. If the value in the CLT has not exceeded T2, the methodology loops back to decision block 2068. If the value of the CLT has exceeded T2, the methodology proceeds to block 2060 and progresses as described above.

Returning to decision block 2068, if pawl switch 280 is open, the methodology proceeds to block 2076 where the CLT is cleared. The methodology then proceeds to block 2080 where cinch motor 412 and cinch clutch 416 are turned off. The methodology then proceeds to bubble 2044 and progresses as described above.

Referring back to decision block 2028 in FIG. 35, if sliding door 36 is operating in an opening or a closing cycle, the methodology proceeds to decision block 2084 where the methodology determines if sliding door 36 is operating in an opening cycle. The methodology is able to determine the direction of operation through the use of the hold open switch 964, the pawl and ratchet switches 280 and 284, and through the use of a register which records whether the last cycle was an opening cycle or a closing cycle. For example, if the register indicated that the last cycle had been a closing cycle, the methodology will generally operate in an opening cycle the next time the power sliding door system 10. An exception to this general rule of operation is where the hold open switch 964 had indicated that sliding door 36 was already in the fully open position. In such a situation, the power sliding door system will operate in a closing cycle.

Similarly, if the register indicates that the last cycle was an opening cycle, the methodology will generally operate in a closing cycle the next time the power sliding door system 10 is actuated. An exception to this general rule of operation is where the pawl and ratchet switches 280 and 284 indicate that sliding door 36 is already in the fully latched position. In such a situation, the power sliding door system will operate in an opening cycle. If sliding door 36 is operating in an opening cycle, the methodology loops back to decision block 2004. If sliding door 36 is not operating in an opening cycle in decision block 2084, the methodology proceeds to block 2088 and turns cinch motor 412 on in a releasing direction (i.e., such that latch sector 264 is operated in the second direction), cinch clutch 416 is turned on, and the cinch latch release timer (CLRT) is started.

The methodology then proceeds to decision block 2092 where the status of pawl switch 280 is evaluated. If pawl switch 280 is open, the methodology proceeds to decision block 2096 where the methodology determines if the value in the CLRT has exceeded a predetermined maximum time (T2). If the value in the CLRT has not exceeded T2, the methodology loops back to decision block 2092. If the value of the CLRT has exceeded T2, the methodology proceeds to block 2100 where cinch motor 412 and cinch clutch 416 are turned off. The methodology proceeds to block 2104 where a DTC is stored in control module 54 which prevents further operation of sliding door 36 in an automatic mode.

Returning to decision block 2092, if pawl switch 280 is not open, the methodology proceeds to decision block 2108 where ratchet switch 282 is evaluated. If ratchet switch 282 is open, the methodology proceeds to decision block 2112 where the value in CLRT is evaluated. If the value in CLRT has exceeded T2, the methodology proceeds to block 2100. If the value in CLRT has not exceeded T2, the methodology loops back to decision block 2108.

Referring back to decision block 2108, it ratchet switch 282 is not open, the methodology proceeds to block 2116 where drive clutch 206 is turned on and a Hall effect counter (HEC) is set to 0. The methodology proceeds to block 2120 where drive motor 210 is turned on and the power sliding door interrupt (PSDI) subroutine is started. The PSDI subroutine is discussed in detail below. The methodology proceeds to decision block 2124.

In block 2124, the methodology evaluates the speed of drive motor 210 utilizing the signal produced by Hall effect sensor 214. If the speed of drive motor 210 is not greater than a predetermined speed (MSPD), the methodology proceeds to block 2128 where a DTC is stored in control module 54 which aids in the trouble shooting of power sliding door system 10, but which does not disable the operation of sliding door 36 in a fully automatic mode. The methodology then proceeds to bubble 2132 where the methodology proceeds along branch 3*b*.

Referring to FIG. 36, the methodology progresses from bubble 2132 to block 2136 where the present direction of drive motor 210 is reversed. The methodology proceeds to block 2140 where the logic for the HEC is adjusted to alter the value in the HEC in accordance with the new direction in which sliding door 36 is being moved. The methodology then proceeds to block 2144 where the C55 command is cleared and the obstacle detection subroutine is started. The obstacle detection subroutine utilizes information from Hall effect sensor 214 to determine whether sliding door 36 has contacted an obstacle. The methodology proceeds to decision block 2148 where the value in the HEC is evaluated.

If the value in the HEC is greater than a first predetermined counter value (C1), such as 560 counts, the methodology proceeds to block 2152 where the speed of drive motor 210 is decelerated to a predetermined motor speed. The methodology then proceeds to decision block 2156 where the methodology determines if sliding door 36 has contacted an obstacle. The methodology concludes that sliding door 36 had detected an obstacle, for example, if the value in the HEC is greater than a predetermined maximum counter value indicating that drive clutch 206 has experienced excessive slippage due to contact between sliding door 36 and an obstacle.

If sliding door 36 has not contacted an obstacle, the methodology proceeds to decision block 2160 where the status of pawl switch 280 is evaluated. If pawl switch is open, the methodology proceeds to block 2164 where drive motor 210 is turned off and the PSDI subroutine is terminated. The methodology proceeds to block 2168 where drive clutch 206 is turned off. The methodology then proceeds to decision block 2036 and continues in the manner described above.

Returning to decision block 2160, if pawl switch 280 is not open, the methodology proceeds to decision block 2172 where the value in the HEC is evaluated. If the value in the HEC is not greater than a second predetermined counter value (C2), the methodology proceeds to decision block 2176 where the C55 command is evaluated. If a new C55 command has not been issued, the methodology loops back to decision block 2156. If a new C55 command has been issued, the methodology proceeds to bubble 2180 and proceeds along branch 2*b*.

Returning briefly to decision block 21 72, if the value in HEC is greater than C2, the methodology proceeds to block 2184 where a DTC is stored in control module 54 which aids in the trouble shooting of power sliding door system 10, but which does not disable the operation of sliding door 36 in a fully automatic mode. The methodology then proceeds to bubble 2180 and proceeds along branch 2*b*.

Returning briefly to decision block 2156, if an obstacle has been detected, the methodology proceeds to bubble 2180 and proceeds along branch 2*b*.

Returning to decision block 2148, if the value in HEC does not exceed Cl, the methodology proceeds to decision block where the C55 command is evaluated. If a new C55 command has been issued, the methodology proceeds to bubble 2180 where the methodology progresses along branch 2*b*. If a new C55 command has not been issued, the methodology proceeds to decision block 2192 where the methodology determines if sliding door 36 has contacted an obstacle. If sliding door 36 has contacted an obstacle, the methodology proceeds to bubble 2180 and progresses along branch 2*b*. If the methodology has not detected an obstacle, the methodology loops back to decision block 2148.

Referring back to FIG. 35, the methodology proceeds from bubble 2180 to block 2196 where the present direction of drive motor 210 is reversed. The methodology proceeds to block 2200 where the logic for the HEC is adjusted to alter the value in the HEC in accordance with the new direction in which sliding door 36 is being moved. The methodology then proceeds to block 2204 where the C55 command is cleared and the obstacle detection subroutine is started. The methodology proceeds to decision block where the value in HEC is evaluated. If the value in HEC is not greater than a third predetermined counter value (C3), the methodology proceeds to decision block 2212 where the C55 command is evaluated.

If a new C55 command has been issued in decision block 2212, the methodology proceeds to bubble 2132 and proceeds along branch 3*b* as described above. If a new C55 command has not been issued in decision block 2212, the methodology proceeds to decision block 2216 where the methodology determines if an obstacle has been detected. If an obstacle has been detected, the methodology proceeds to bubble 2132 and proceeds along branch 3b as described above. If an obstacle has not been detected, the methodology loops back to decision block 2208.

In decision block 2208, if the value in the HEC is greater than C3, the methodology proceeds to block 2220 where drive motor 210 is decelerated to a predetermined speed. The methodology then proceeds to decision block 2224 where the value in the HEC is evaluated. If the value in the HEC is greater than C2, the methodology proceeds to block 2228 where a DTC is stored in control module 54 which aids in the trouble shooting of power sliding door system 10, but which does not disable the operation of sliding door 36 in a fully automatic mode. The methodology proceeds to block 2232 where the value in the HEC is stored to the memory of control module 54. The methodology proceeds to block 2236 where drive motor 210 and drive clutch 206 are turned off and the PSDI subroutine is terminated. The methodology then loops back to decision block 2004.

Returning to decision block 2224, if the value in the HEC is not greater than C2, the methodology proceeds to decision block 2240 where the status of hold open switch 964 is evaluated. If hold open switch 964 is not open indicating that sliding door 36 is not in the full open position, the methodology proceeds to block 2232. If hold open switch 964 is open, the methodology proceeds to decision block 2244 where the methodology determines if sliding door 36 has contacted an obstacle. If sliding door 36 has not contacted an obstacle, the methodology proceeds to decision block 2248 where the status of the C55 command is evaluated. If a new C55 command has been issued in decision block 2248, the methodology proceeds to bubble 2132 and proceeds along branch 3b as described above. If a new C55 command has not been issued in decision block 2248, the methodology loops back to decision block 2224.

Referring back to decision block 2244, if sliding door 36 has contacted an obstacle, the methodology proceeds to block 2252 where the present direction of drive motor 210 is reversed. The methodology proceeds to decision block 2256.

In decision block 2256, the methodology determines if sliding door 36 has contacted a second obstacle within a predetermined time interval (T2). If sliding door has contacted an obstacle within T2, the methodology proceeds to block 2260 where a DTC is stored in control module 54 which aids in the trouble shooting of power sliding door system 10, but which does not disable the operation of sliding door 36 in a fully automatic mode. The methodology proceeds to block 2236 and progresses as described above.

Returning to decision block 2256, if sliding door 36 has not contacted a second obstacle within T2, the methodology proceeds to bubble 2264 and progresses along branch 3*f*. With brief reference to FIG. 36, the methodology proceeds from bubble 2264 to block 2140 and progresses as described above.

Referring back to decision block 2124, if the speed of drive motor 210 is greater than SPD, the methodology proceeds to block 2266 where cinch motor 412 and cinch clutch 416 are turned off. The methodology then proceeds to block 2204 and progresses as described above.

Returning to decision block 2020, if ratchet switch 282 is open, the methodology proceeds to decision block 2268 where the status of hold open switch 964 is evaluated. If hold open switch 964 is open, the methodology proceeds to decision block 2272 where the status of lock switch 714 is evaluated. If lock switch 714 is open in decision block 2272, the methodology proceeds to block 2088 as described above. If lock switch 714 is not open in decision block 2272, the methodology loops back to decision block 2004.

Returning to decision block 2268, if hold open switch 964 is not open, the methodology proceeds to decision block 2276 where the methodology determines if sliding door 36 is being operated in either an opening cycle or a closing cycle. If sliding door 36 is not being operated in either an opening cycle or a closing cycle, the methodology proceeds to block 2280 where a DTC is stored in the memory of control module 54 which aids technicians in evaluating failures in the power sliding door system 10 and also causes control module 54 to disable the automatic operation of sliding door 36. If, however, sliding door 36 is operating in either an opening cycle or a closing cycle in decision block 2276, the methodology loops back to decision block 2004.

Referring back to decision block 2016, if pawl switch 280 is not open, the methodology proceeds to decision block 2284 where the status of ratchet switch 282 is evaluated. If ratchet switch is open, the methodology proceeds to decision block 2288 where the methodology determines if sliding door 36 is being operated in either an opening cycle or a closing cycle. If sliding door 36 is being operating in either an opening cycle or a closing cycle, the methodology loops back to decision block 2004. If sliding door 36 is not being operating in either an opening cycle or a closing cycle in decision block 2288, the methodology proceeds to block 2292 where a DTC is stored in the memory of control module 54 which aids technicians in evaluating failures in the power sliding door system 10 and also causes control module 54 to disable the automatic operation of sliding door 36.

Referring back to decision block 2284, if ratchet switch 282 is open, the methodology proceeds to decision block 2296 where the status of hold open switch 964 is evaluated. If hold open switch is open, the methodology proceeds to decision block 2300 where the methodology determines if sliding door 36 is being operated in either an opening cycle or a closing cycle. If sliding door 36 is not being operating in either an opening cycle or a closing cycle, the methodology proceeds to block 2304 where the methodology determines that sliding door 36 is being operated manually. The methodology then loops back to decision block 2004. Returning to decision block 2300, if sliding door 36 is being operating in either an opening cycle or a closing cycle, the methodology proceeds to decision block 2308.

In decision block 2308, if sliding door is not being operated in an opening cycle, the methodology proceeds to decision block 2312 where the value in the HEC is evaluated. If the value in the HEC is greater than C1, the methodology proceeds to bubble 2316 and proceeds along branch 2*d*. With brief reference to FIG. 36, the methodology proceeds from bubble 2316 to decision block 2188 and progresses as described above. Returning to decision block 2312 in FIG. 35, if the value in the HEC is not greater than C1, the methodology proceeds to bubble 2320 and progresses along branch 2e. With brief reference to FIG. 36, the methodology proceeds from bubble 2320 to decision block 2176 and progresses as described above.

Referring back to decision block 2308 in FIG. 35, if sliding door 36 is not being operated in an opening cycle, the methodology proceeds to decision block 2324 where the value in the HEC is evaluated. If the value in the HEC is not greater than C3, the methodology proceeds to decision block 2212 and progresses as described above. If the value in the HEC is greater than C3, the methodology proceeds to decision block 2248 and progresses as described above.

Returning to decision block 2296, if hold open switch 964 is not open, the methodology proceeds to block 2328 where the HEC is set to 0. The methodology proceeds to block 2332 where cinch motor 412 and cinch clutch 416 are turned on and the cinch latch timer is started. The methodology proceeds to decision block 2336 where the status of hold open switch 964 is evaluated. If hold open switch 964 is not open, the methodology proceeds to decision block 2340 where the value in the cinch latch timer is evaluated.

If the value in the cinch latch timer is not greater than T2, the methodology loops back to decision block 2336. If the value in the cinch latch timer is greater than T2, the methodology proceeds to block 2344 where cinch motor 412 and cinch clutch 416 are turned off. The methodology proceeds to block 2352 where a DTC is stored in the memory of control module 54 which aids technicians in evaluating failures in the power sliding door system 10 and also causes control module 54 to disable the automatic operation of sliding door 36.

Referring back to decision block 2336, if hold open switch 964 is open, the methodology proceeds to block 2356 where drive clutch 206 is turned on. The methodology next proceeds to block 2360 where drive motor 210 is turned on and the PSDI subroutine is started. The methodology then proceeds to decision block 2364 where the speed of drive motor 210 is evaluated. If the speed of drive motor 210 is not greater than SPD, the methodology proceeds to block 2368 where a DTC is stored in control module 54 which aids in the trouble shooting of power sliding door system 10, but which does not disable the operation of sliding door 36 in a fully automatic mode. The methodology proceeds to block 2196 and progresses as described above.

Returning to decision block 2364, if the speed of drive motor 210 is greater than SPD, the methodology proceeds to block 2372 where cinch motor 412 and cinch clutch 416 are turned off. The methodology proceeds to bubble 2376 and progresses along branch 4. With brief reference to FIG. 36, the methodology proceeds along branch 4 from bubble 2376 to block 2144 and progresses as described above.

Figure 37:
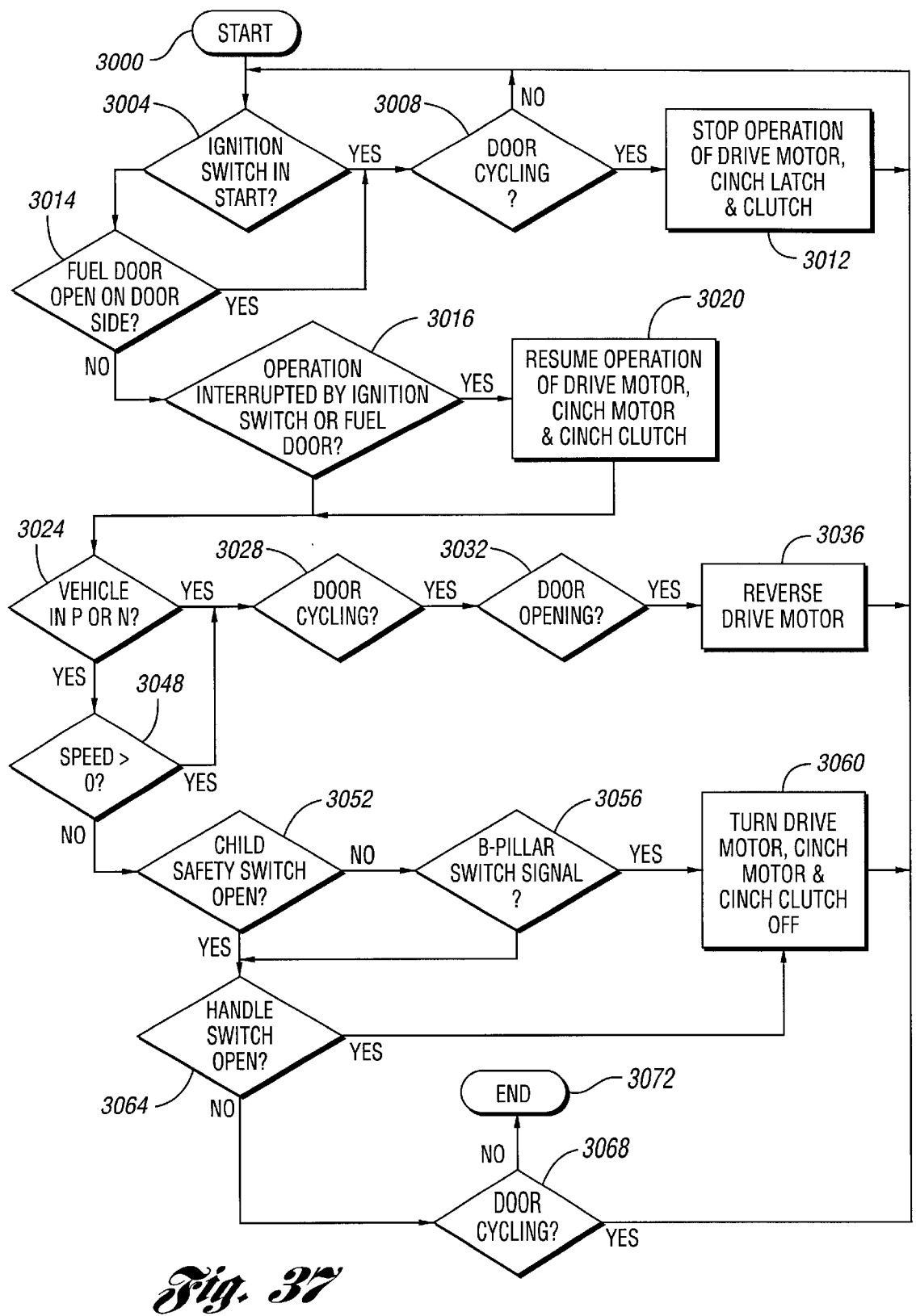
FIG. 37 is a schematic diagram in flowchart form of the power door interrupt subroutine of the present invention.

With reference to FIG. 37, the PSDI subroutine is entered through bubble 3000 and proceeds to decision block 3004 where the methodology determines if ignition switch 980 is being operated to start engine 42. If ignition switch 980 is being operated to start engine 42, the methodology proceeds to decision block 3008 where the methodology determines if sliding door 36 is being operated in either an opening cycle or a closing cycle. If sliding door 36 is not being operated in either an opening cycle or a closing cycle, the methodology loops back to bubble 3000. If sliding door 36 is being operated in either an opening cycle or a closing cycle, the methodology proceeds to block 3012 where control module 54 determines if drive motor 210 or cinch motor 412 and cinch clutch 416 are operating and halts their operation. The methodology loops back to bubble 3000.

If ignition switch 980 is not being operated to start engine 42 in decision block 3004, the methodology proceeds to decision block 3014 where the methodology determines whether a fuel door 3015 pivotably coupled to vehicle body 14 is in an open position in the path of sliding door 36. Preferably, the methodology determines the position of fuel door 3015 from a fuel door position sensor 3015a which produces a fuel door position sensor signal indicative of the position of fuel door 3015. Preferably, fuel door position sensor 3015a is a limit switch which produces a digital signal in response to the placement of fuel door 3015 into or removal of fuel door 3015 from its closed position. Alternatively, the obstacle detection methodology may also be employed to determine whether fuel door 3015 has been positioned in the path of sliding door 36. If the methodology determines that fuel door 3015 has been placed in the path of sliding door 36, the methodology proceeds to decision block 3008 and proceeds as described above. If fuel door 3015 has not been placed in the path of sliding door 36, the methodology proceeds to decision block 3016.

In decision block 3016 the methodology determines if the operation of sliding door 36 was interrupted by the operation of ignition switch 980 or the placement of fuel door 3015 in the path of sliding door 36. If the operation of sliding door 36 was not interrupted by the operation of ignition switch 980 or the placement of fuel door 3015, the methodology proceeds to decision block 3024. If the operation of sliding door 36 was interrupted by the operation of ignition switch 980 or the placement of fuel door 3015, the methodology proceeds to block 3020 where control module 54 causes drive motor 210 or cinch motor 412 and cinch clutch 416 to resume their operation. The methodology proceeds to decision block 3024.

In decision block 3024, the methodology determines if vehicle 12 is being operated in one of the park and neutral gear settings. If vehicle 12 is not being operated in one of the park and neutral gear settings, the methodology proceeds to decision block 3028 where the methodology determines if sliding door 36 is being operated in either an opening cycle or a closing cycle. If sliding door 36 is not being operated in either an opening cycle or a closing cycle, the methodology loops back to decision block 3004. If sliding door 36 is being operated in either an opening cycle or a closing cycle, the methodology proceeds to block 3032 where the methodology determines if sliding door 36 is being operated in an opening cycle. If sliding door 36 is not being operated in an opening cycle, the methodology loops back to decision block 3004. If sliding door 36 is being operated in an opening cycle, the methodology proceeds to block 3036 where the current direction of drive motor 210 is reversed and the logic for the HEC is adjusted to alter the value in the HEC in accordance with the new direction in which sliding door 36 is being moved. The methodology then loops back to decision block 3004.

Returning to decision block 3024, if vehicle 12 is being operated in one of the park and neutral gear settings, the methodology proceeds to decision block 3048 where the methodology evaluates the speed of vehicle 12. If the speed of vehicle is not approximately 0 miles per hour, the methodology proceeds to decision block 3028. If the speed of vehicle 12 is approximately 0 miles per hour in decision block 3048, the methodology proceeds to decision block 3052 where the status of child guard switch 966 is evaluated. If child guard switch 966 is open, the methodology proceeds to decision block 3056 where the methodology determines if the C55 command to initiate the automatic actuation of sliding door 36 was issued in response to a request from internal switch 134'. If the C55 command was issued in response to a request from internal switch 134', the methodology proceeds to block 3060 where drive motor 210, drive clutch 206, cinch motor 412 and cinch clutch 416 are turned off. The methodology then loops back to decision block 3004. If the C55 command was not issued in response to a request from internal switch 134', the methodology proceeds to decision block 3064 where the status of handle switch 146 is evaluated. If handle switch 146 is open, the methodology proceeds to block 3060. If handle switch 146 is not open, the methodology proceeds to decision block 3068 where the methodology determines if sliding door 36 is being operated in either an opening cycle or a closing cycle. If sliding door 36 is not being operated in either an opening cycle or a closing cycle, the methodology proceeds to bubble 3072 where the subroutine terminates. If sliding door 36 is being operated in either an opening cycle or a closing cycle, the methodology loops back to decision block 3004.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the description of the appended claims.

What is claimed is:

1. In a vehicle having a body and a sliding door system including a door assembly slidably interconnected with the body, a power door drive assembly having a drive motor for driving the door assembly between an open position and a closed position under a source of power, a power latching mechanism for engaging an element carried by the body, and at least one manual door handle for manually controlling the latching mechanism, a method for controlling the operation of the power sliding door system comprising:

determining whether the drive motor is moving the door assembly; and arresting movement of the door assembly in response to manual actuation of the at least one manual door handle, wherein the power drive assembly includes a power-driven rotatable pinion that is coupled to the door assembly and engages a rack that is coupled to the vehicle body, and wherein determining that the door assembly is being moved by the drive motor includes monitoring rotation of the pinion with a sensor, and generating a signal in response to rotation of die pinion.

2. The method of claim 1 further including disengaging the power drive assembly from the door assembly in response to manual actuation of the door handle.

3. The method of claim 2, we disengaging the power drive assembly includes providing a clutching mechanism for selectively engaging and digging the power drive assembly with the door assembly.

4. The method of claim 1 wherein the at least one door handle includes an inner door handle and an outer door handle, and further wherein arresting movement of the door assembly in response to manual actuation of the at least one manual door handle includes arresting movement of the door assembly in response to manual actuation of either the inner or handle or the outer door handle.

5. The method of claim 1 further including manually moving the door assembly between the open position and the closed position.

6. The method of claim 1 wherein arresting movement of the door assembly in response to manual actuation of the at least one manual door handle includes providing a handle sensor operative for producing a signal in response to manual actuation of the at least one manual handle.

7. The method of claim 1 wherein determining that the drive motor is moving the door assembly includes:

determining a first direction in which the power sliding door system was last operated;

determining from at least one sensor if the door assembly has been placed in a predetermined position;

operating the power sliding door system in a direction opposite the first direction if the door assembly has not been placed in the predetermined position; and operating the power sliding door system in the first direction if the door assembly has been placed in the predetermined position.

8. The method of claim 1 wherein determining whether the drive motor is moving the door assembly includes utilizing a door mounted control module for determining whether the drive motor is moving the door assembly between the open position and the closed position.

9. The method of claim 1 wherein determining whether the at least one door handle has been manually actuated includes:

utilizing a door mounted control module to determine whether the at least one door handle has been manually actuated.

10. The method of claim 1 further comprising providing the power drive assembly on the sliding door and providing the power latching mechanism on the sliding door.

11. In a vehicle having a body, a sliding door assembly that is slidably interconnected with the body and a striker fixed to the vehicle body, a method of operating the sliding door assembly comprising:

providing a power drive assembly having drive motor for driving the door assembly between an open position and a closed position under a source of power;

providing a power latching mechanism having a latch ratchet and a latch motor for rotating the latch ratchet between a fully unlatched position, wherein the latch ratchet is disengaged from the striker, and a fully latched position, wherein the latch ratchet is fully engaged to the striker, and wherein rotation of the latch ratchet from the fully unlatched position and the fully latched position operates to draw the door assembly into the closed position;

determining whether the door assembly is being moved by one of the drive motor and the latch motor;

determining whether a handle on the door assembly has been manually actuated;

arresting movement of the drive motor and the latch motor if the handle on the door assembly has been manually actuated and one of the drive motor and the latch motor are moving the door assembly; and positing the latch ratchet in the fully unlatched condition if the movement of the drive motor and the latch motor has been arrested in response to the manual actuation of the handle on the door assembly, wherein the power drive assembly includes a power-driven rotatable pinion that is coupled to the door assembly and engages a rack that is coupled to the vehicle body, and wherein the step of determining whether the door assembly is being moved by one of the drive motor and the latch motor includes:

providing a sensor for monitoring rotation of the pinion; and generating a signal in response to rotation of the pinion.

12. The method of claim 11 wherein arresting movement of the drive motor and the latch motor includes disengaging the power drive assembly from the door assembly in response to the manual action of the door handle.

13. The method of claim 12, wherein disengaging the power drive assembly includes providing a clutching mechanism for selectively engaging and disengaging the power drive assembly from the door assembly.

14. The method of claim 11 wherein arresting movement of the drive motor and the latch motor includes:

providing a control module for controlling the drive motor and the latch motor; and providing a handle sensor operative for producing a handle sensor signal in response to manual actuation of the handle.

15. The method of claim 11 wherein positioning the latch ratchet in the fully unlatched condition includes:

providing a latch clutch for selectively coupling the latch motor to the latch ratchet;

providing a latch return spring for biasing the latch ratchet toward the fully unlatched position; and disengaging the latch clutch to uncouple the latch motor from the latch ratchet.

* * * * *